United States Patent
Ikeda

(10) Patent No.: US 11,281,707 B2
(45) Date of Patent: Mar. 22, 2022

(54) SYSTEM, SUMMARIZATION APPARATUS, SUMMARIZATION SYSTEM, AND METHOD OF CONTROLLING SUMMARIZATION APPARATUS, FOR ACQUIRING SUMMARY INFORMATION

(71) Applicant: CANON KABUSHIKI KAISHA, Tokyo (JP)

(72) Inventor: Motoki Ikeda, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 16/199,591

(22) Filed: Nov. 26, 2018

(65) Prior Publication Data

US 2019/0171760 A1  Jun. 6, 2019

(30) Foreign Application Priority Data

Dec. 1, 2017  (JP) .............................. JP2017-232087

(51) Int. Cl.
| | | |
|---|---|---|
| *G06F 16/34* | (2019.01) | |
| *G10L 15/26* | (2006.01) | |
| *G10L 15/08* | (2006.01) | |
| *G06K 9/32* | (2006.01) | |
| *G06F 16/31* | (2019.01) | |

(52) U.S. Cl.
CPC .......... *G06F 16/345* (2019.01); *G06F 16/313* (2019.01); *G06K 9/325* (2013.01); *G10L 15/08* (2013.01); *G10L 15/26* (2013.01); *G06K 2209/01* (2013.01); *G10L 2015/088* (2013.01)

(58) Field of Classification Search
CPC ..... G06F 16/345; G06F 16/313; G06K 9/325; G06K 2209/01; G10L 15/08; G10L 15/26; G10L 2015/088
USPC ......................................................... 715/254
See application file for complete search history.

(56) References Cited

U.S. PATENT DOCUMENTS

| | | | |
|---|---|---|---|
| 9,875,225 B1* | 1/2018 | Grueneberg | H05K 999/99 |
| 2010/0031142 A1 | 2/2010 | Nagatomo | |
| 2013/0138435 A1* | 5/2013 | Weber | G10L 25/57 |
| | | | 704/231 |
| 2016/0284354 A1* | 9/2016 | Chen | H04N 7/147 |
| 2017/0255446 A1* | 9/2017 | Malatesha | G06F 3/03545 |
| 2018/0158159 A1* | 6/2018 | Divine | G06Q 50/184 |
| 2018/0268817 A1* | 9/2018 | Aono | G10L 15/22 |

(Continued)

FOREIGN PATENT DOCUMENTS

JP            5104762 B2    12/2012

*Primary Examiner* — Hope C Sheffield

(74) *Attorney, Agent, or Firm* — Rossi, Kimms & McDowell LLP

(57) ABSTRACT

A system that outputs information generated by summarizing contents of voices and images as texts. A CPU of the system performs, according to a program stored in a memory, recording voice data and captured image data, generating first text information by performing speech recognition on the acquired voice data, generating second text information by performing character recognition on the acquired image data, and generating summary text information smaller in the number of characters than the first text information and the second text information, based on the first text information and the second text information, according to a predetermined criterion.

19 Claims, 18 Drawing Sheets

(56) References Cited

U.S. PATENT DOCUMENTS

2019/0019511 A1\* 1/2019 Kawano ................. G06F 40/58
2019/0037171 A1\* 1/2019 Nagpal ............... H04L 12/1822

\* cited by examiner

FIG. 4A

| VOICE RECORDING START TIME | VOICE RECORDING END TIME | VOICE DATA |
|---|---|---|
| 2017/08/09 13:00:15 | 2017/08/09 14:28:55 | /data/sound.wav |

| IMAGE CAPTURING TIME | IMAGE DATA |
|---|---|
| 2017/08/09 13:09:15 | /data/image1.jpg |
| 2017/08/09 13:09:55 | /data/image2.jpg |
| 2017/08/09 13:12:25 | /data/image3.jpg |
| ... | ... |

| AGENDA ITEM START TIME | AGENDA ITEM END TIME | AGENDA ITEM NAME |
|---|---|---|
| 2017/08/09 13:02:27 | 2017/08/09 13:31:55 | Budget for next year |
| 2017/08/09 13:32:44 | 2017/08/09 14:01:07 | Discussion about division of rolls |
| 2017/08/09 14:02:03 | 2017/08/09 14:27:57 | Plan of this month |
| ... | ... | ... |

| SPEECH TIME | SPOKEN TEXT |
|---|---|
| 2017/08/09 13:01:27 | Now, we start the meeting. The first item of agenda is ... |
| 2017/08/09 13:02:59 | Because the accuracy is more important than usual, ... |
| 2017/08/09 14:03:41 | Further, next year ... |
| ... | ... |

FIG. 6B

| WRITING TIME | WRITTEN TEXT |
|---|---|
| 2017/08/09 13:10:10 | Points of organization: ○○○, △△△△△, ×× × |
| 2017/08/09 14:39:36 | Mr. B or Mr. C is suited for ♦♦♦ |
| ... | ... |

FIG. 6C

| GENERATION TIME | MEETING TEXT | CLASSIFI-CATION | MAIN POINT |
|---|---|---|---|
| 2017/08/09 13:01:27 | Now, we start the meeting. The first item of agenda is .... | 0 | 0 |
| 2017/08/09 13:04:09 | Because the accuracy is more important than usual, .... | 0 | 0 |
| ... | ... | | |
| 2017/08/09 13:10:10 | Points of making budget: ○○○, △△△, accuracy | 1 | 1 |
| ... | ... | | |
| 2017/08/09 13:30:01 | Mr. D will create a revised plan, .... | 0 | 1 |
| ... | ... | | |
| 2017/08/09 13:35:12 | ○○○ is NG for Mr. A | 1 | 0 |
| ... | ... | | |

| AGENDA ITEM NAME | SUMMARY TEXT |
|---|---|
| Budget for next year | The budget for next year will be created focusing on ○○○. The present plan needs reconsideration with respect to △△△. |
| Discussion about division of rolls | We discuss division of rolls. Mr. A has been in charge of ○○ for two consecutive years, so it is necessary to change the person in charge of ○○. Mr. C is requested to be in charge of ○○ ... |
| ... | ... |

FIG. 12A

| DISPLAY TIME | DISPLAY IMAGE DATA |
|---|---|
| 2017/08/09 13:03:51 | /data/slide1.jpg |
| 2017/08/09 13:08:32 | /data/slide2.jpg |
| 2017/08/09 13:16:00 | /data/slide3.jpg |
| ... | ... |

FIG. 12B

| WRITING TIME | ELECTRONICALLY WRITTEN IMAGE DATA |
|---|---|
| 2017/08/09 13:09:15 | /data/image1.jpg |
| 2017/08/09 13:09:55 | /data/image2.jpg |
| 2017/08/09 13:12:25 | /data/image3.jpg |
| ... | ... |

SYSTEM, SUMMARIZATION APPARATUS, SUMMARIZATION SYSTEM, AND METHOD OF CONTROLLING SUMMARIZATION APPARATUS, FOR ACQUIRING SUMMARY INFORMATION

BACKGROUND OF THE INVENTION

Field of the Invention

The present invention relates to a summarization apparatus and so forth, for acquiring summary information e.g. for generating minutes of a meeting.

Description of the Related Art

Conventionally, there has been known a system for generating minutes of a meeting. A content summarizing system disclosed in Japanese Patent No. 5104762 generates minutes of a meeting by performing speech recognition on human speech, converting the voice to texts, and summarizing the texts. Further, the content summarizing system generates minutes of a meeting by performing image recognition on characters included in video, converting the recognized images to texts, and summarizing the texts. According to the technique disclosed in Japanese Patent No. 5104762, it is possible to generate minutes of a meeting by summarizing only texts acquired from human speech (hereinafter referred to as the "spoken text(s)"). Further, the technique disclosed in Japanese Patent No. 5104762 performs image recognition on characters included in video, converts the recognized images to texts, and summarizes the texts, and hence it is also possible to generate minutes of a meeting by summarizing only texts acquired e.g. from characters written by a user (hereinafter referred to as the "written text(s)").

However, in the meeting minutes generated based only on one of the spoken text(s) and the written text(s), loss of information can occur. For example, there are cases where a user does not necessarily speak content entered in a writing medium, or cases where a user does not necessarily write the content of speech.

More specifically, when an important point is spoken in a discussion in a meeting, what is spoken is sometimes written in a writing medium, not as it is but after being replaced by a more proper and concise expression. Further, there is a case where a person writes out known matters, such as a point of discussion identified in the last meeting, and he/she speaks e.g. "on this point" while pointing at the written known matters without reading out i.e. speaking all of them. Furthermore, in general, a user writes and visualizes a point of discussion in a writing medium, and hence there are cases where a process through which the point is derived and a background of the discussion appear only in the speech but are not written in the writing medium.

As described above, in the case where minutes of a meeting are generated by summarizing only either the spoken text(s) or the written text(s), loss of important information can occur, so that desired minutes sometimes cannot be generated.

SUMMARY OF THE INVENTION

The present invention provides a system, a summarization apparatus, a summarization system, and a method of controlling the summarization apparatus, for acquiring summary information.

In a first aspect of the present invention, there is provided a system that outputs information generated by summarizing contents of voice and images, as texts, including a memory that stores a program, and at least one processor that performs, according to the program, processing comprising obtaining recorded voice data and captured image data, generating first text information by performing speech recognition on the obtained voice data, generating second text information by performing character recognition on the obtained image data, and generating summary text information corresponding to a summary of the recorded voice data and the captured image data, based on the first text information generated by the speech recognition and the second text information generated by the character recognition.

In a second aspect of the present invention, there is provided a summarization apparatus comprising a first generation unit configured to generate first text information by converting voice data to texts, a second generation unit configured to generate second text information by converting image data to texts, an integration unit configured to integrate the first text information generated by the first generation unit and the second text information generated by the second generation unit to thereby generate integrated text information formed by at least one text, and a summarization unit configured to generate summary information by summarizing the integrated text information integrated by the integration unit.

In a third aspect of the present invention, there is provided a summarization system including a summarization apparatus, and a terminal unit that is capable of communicating with the summarization apparatus, the summarization apparatus comprising a first generation unit configured to generate first text information by converting voice data to texts, a second generation unit configured to generate second text information by converting image data to texts, an integration unit configured to integrate the first text information generated by the first generation unit and the second text information generated by the second generation unit to thereby generate integrated text information formed by at least one text, and a summarization unit configured to generate summary information by summarizing the integrated text information integrated by the integration unit, and the terminal unit comprising a voice acquisition unit configured to acquire voice data from speech of a user, an image acquisition unit configured to acquire image data by image capturing of characters entered by a user, and a transmission unit configured to transmit voice data acquired by the voice acquisition unit and image data acquired by the image acquisition unit to the summarization apparatus, wherein the summarization apparatus includes a reception unit configured to receive voice data and image data, transmitted by the transmission unit.

In a fourth aspect of the present invention, there is provided a method of controlling a summarization apparatus, comprising generating first text information by converting voice data to texts, generating second text information by converting image data to texts, integrating the generated first text information and the generated second text information to thereby generate integrated text information formed by at least one text, and generating summary information by summarizing the integrated text information integrated by the integrating.

According to the present invention, it is possible to obtain a summary from both of voice and images.

Further features of the present invention will become apparent from the following description of exemplary embodiments (with reference to the attached drawings).

BRIEF DESCRIPTION OF THE DRAWINGS

FIGS. 4A to 4C are diagrams showing examples of construction of a voice information table, an image information table, and an agenda information table, respectively.

FIGS. 6A to 6C are diagrams showing examples of construction of a spoken information table, a written information table, and a meeting text table, respectively.

FIG. 7 is a diagram of a summary table.

FIGS. 12A and 12B are diagrams of a displayed image table and an electronically written image table, respectively.

DESCRIPTION OF THE EMBODIMENTS

The present invention will now be described in detail below with reference to the accompanying drawings showing embodiments thereof.

Figure 1:
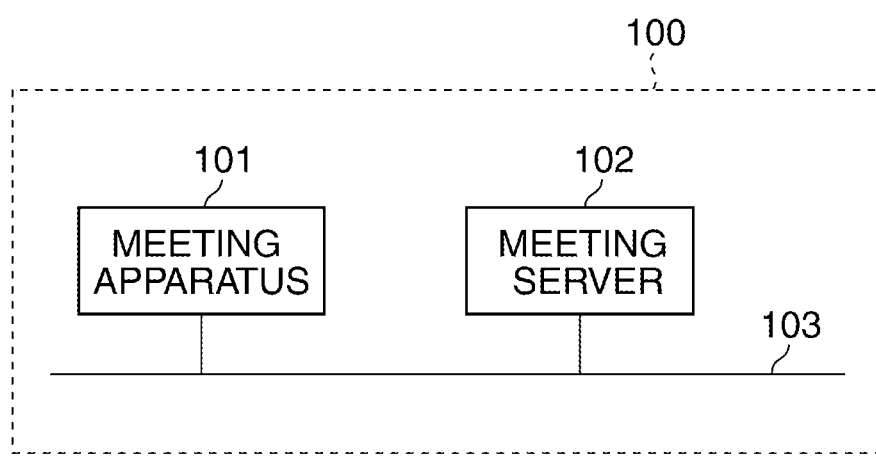
FIG. 1 is an entire configuration diagram of a meeting system including a meeting server as a summarization apparatus according to a first embodiment of the present invention.

FIG. 1 is an entire configuration diagram of a meeting system including a summarization apparatus according to a first embodiment of the present invention. This meeting system, denoted by reference numeral 100 (summarization system), includes a meeting apparatus 101 and a meeting server 102 which functions as the summarization apparatus. The meeting apparatus 101 and the meeting server 102 are connected to each other via a network 103. The meeting apparatus 101 is a terminal unit that is capable of communicating with the meeting server 102.

The meeting apparatus 101 is disposed in a place where a meeting is held, such as a meeting room, and is placed on a meeting table, for example. The meeting apparatus 101 records a plurality of kinds of data, such as voice data and image data (hereinafter referred to as the "meeting information"). The meeting apparatus 101 transmits the meeting information (described hereinafter with reference to FIG. 4) to the meeting server 102. Note that although in FIG. 1, the meeting system 100 includes one meeting apparatus 101 and one meeting server 102, one or both of the meeting apparatus 101 and the meeting server 102 may be provided in plurality. The meeting apparatus 101 records a meeting held e.g. in an office or a predetermined hall. However, the meeting as an object to be recorded by the present invention may be any meeting insofar as a plurality of persons can be visually recognized and speech actions are performed therein, and is not limited to a meeting held e.g. in an office or a predetermined hall. For example, the meeting may be an interview, an investigation, etc.

The meeting server 102 is a general PC (Personal Computer) or a cloud server, which receives meeting information from the meeting apparatus 101, and generates minutes (described hereinafter with reference to FIG. 9) by analyzing and processing the received meeting information. The meeting server 102 generates texts by performing speech recognition on voice data included in the meeting information. Further, the meeting server 102 generates texts by performing character recognition (image recognition) of image data included in the meeting information. The meeting server 102 generates minutes of a meeting based on information including the texts, and distributes the generated minutes.

Figure 2A:
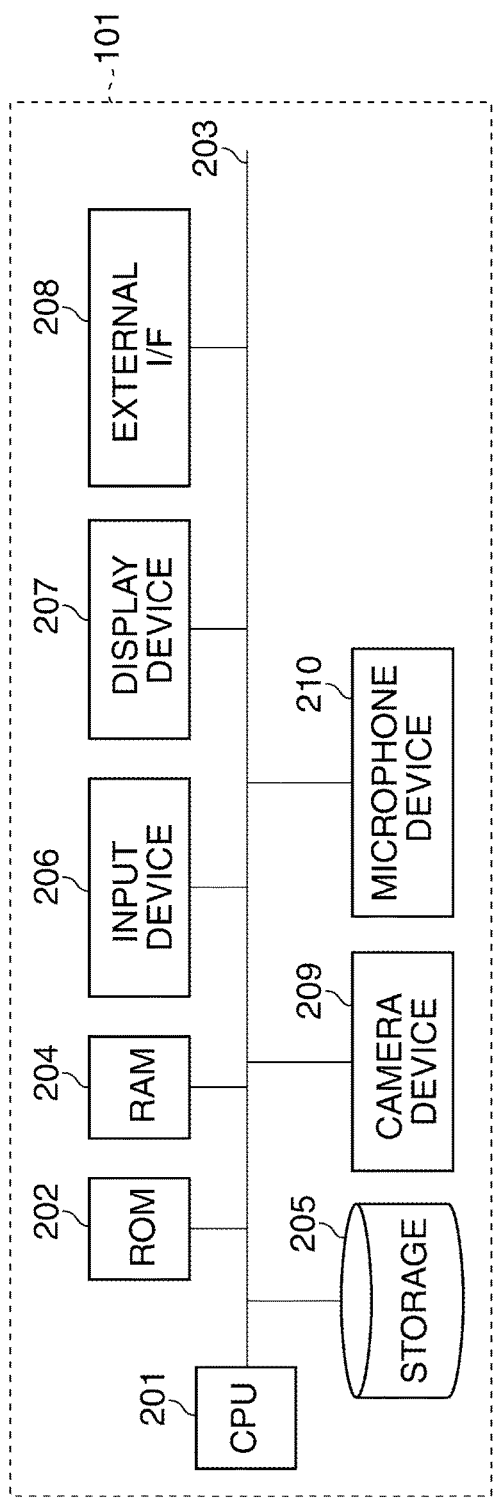
FIG. 2A is a block diagram showing a hardware configuration of a meeting apparatus.
Figure 2B:
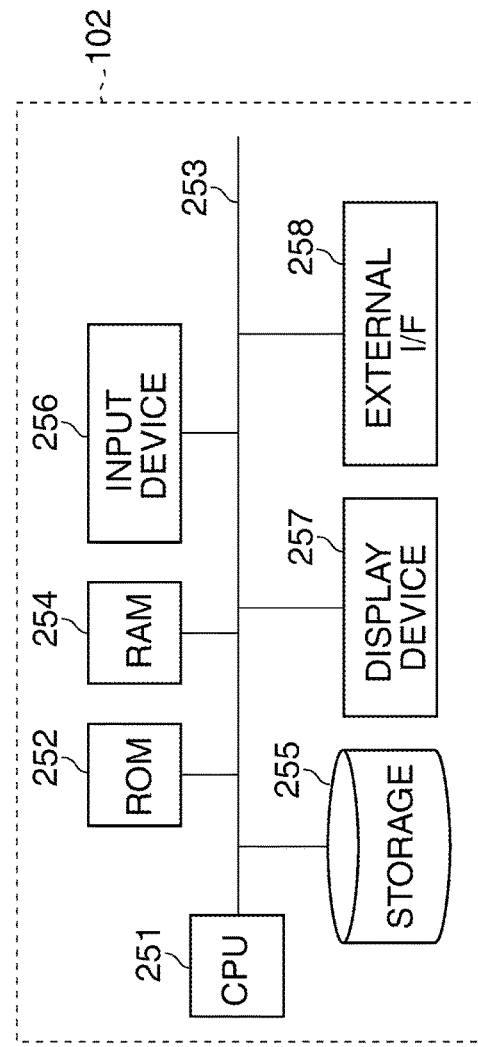
FIG. 2B is a block diagram showing a hardware configuration of a meeting server.

FIGS. 2A and 2B are block diagrams showing hardware configurations of the meeting apparatus 101 and the meeting server 102, respectively. The meeting apparatus 101 includes a CPU 201, a ROM 202, a RAM 204, a storage 205, an input device 206, a display device 207, an external interface 208, a camera device 209, and a microphone device 210. These components are capable of transmitting and receiving data to and from each other via a data bus 203. CPU is an abbreviation of Central Processing Unit. RAM is an abbreviation of Random Access Memory. ROM is an abbreviation of Read Only Memory.

The CPU 201 is a controller for controlling the overall operation of the meeting apparatus 101. The CPU 201 starts an OS (Operating System) using a boot program stored in the ROM 202 as a nonvolatile memory. The CPU 201 executes a controller program stored in the storage 205 on the OS. The controller program is a program for controlling the overall operation of the meeting apparatus 101. The CPU 201 controls the components via the data bus 203. The RAM 204 functions as a temporary storage area, such as a main memory and a work area for the CPU 201. The storage 205 is a readable and writable nonvolatile memory, and stores the above-mentioned controller program. Further, the meeting apparatus 101 stores meeting information until the meeting information is transmitted to the meeting server 102.

The input device 206 is an input device formed by a touch panel, hard keys, a mouse, and so forth, none of which are shown. When a user's operation instruction is received, the input device 206 transmits the received instruction to the CPU 201. The display device 207 is a display device, such as an LCD, and displays image data generated by the CPU 201 for display, on a screen thereof. The CPU 201 determines a user's operation, based on the instruction information received from the input device 206 and the display image data displayed on the display device 207. The CPU 201 controls the meeting apparatus 101 based on a result of the determination, generates new display image data according to the operation, and causes the generated image data to be displayed on the display device 207. The external interface 208 transmits and receives various data to and from a separate external apparatus (not shown) via a network, such as a LAN, a telephone line, or near-field wireless communication using e.g. infrared communication. The camera device 209 is an image pickup apparatus, such as a so-called digital camera or video camera, and is capable of capturing a moving image and a still image. The microphone device 210 acquires voice data, such as WAV, by converting input voice to a digital signal.

The meeting server 102 includes a CPU 251, a ROM 252, a RAM 254, a storage 255, an input device 256, a display device 257, and an external interface 258. These components are capable of transmitting and receiving data to and from each other via a data bus 253. The CPU 251 is a controller for controlling the overall operation of the meeting server 102. The CPU 251 starts an OS using a boot program stored in the ROM 252 as a nonvolatile memory. The CPU 251 executes a meeting server program stored in the storage 255 on the OS. Processing operations of the meeting server 102 are realized by the CPU 251 that executes this meeting server program. The CPU 251 controls the components via the data bus 253. The RAM 254 functions as a temporary storage area, such as a main memory and a work area for the CPU 251. The storage 255 is a readable and writable nonvolatile memory, and stores the above-mentioned meeting server program. The configurations of the external interface 258, the input device 256, and the display device 257 are the same as those of the external interface 208, the input device 206, and the display device 207 of the meeting apparatus 101 (see FIG. 2A).

Next, a user interface provided by the meeting system 100, and viewed and operated by a user will be described. FIGS. 3A to 3E are diagrams showing changes in a screen displayed on the display device 207 of the meeting apparatus 101.

Figure 3A:
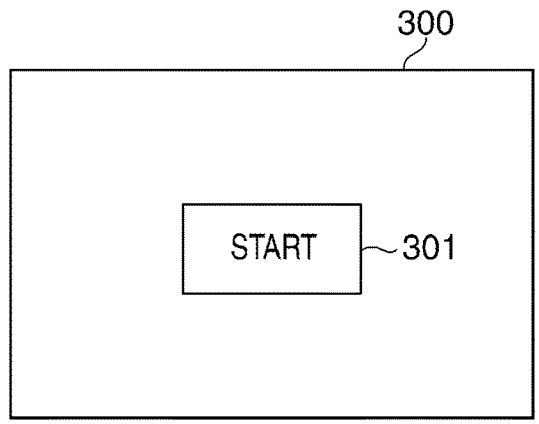
FIGS. 3A to 3E are diagrams showing changes in a screen displayed on a display device of the meeting apparatus.

First, a screen 300 shown in FIG. 3A is a screen displayed before starting a meeting. The user performs an instruction operation on a "start" button 301 using the input device 206 to instruct the meeting apparatus 101 to start the meeting. Upon receipt of the instruction operation on the "start" button 301, the CPU 201 causes a screen 310 shown in FIG. 3B to be displayed on the display device 207. Then, the CPU 201 starts to record meeting information. The screen 310 is a screen displayed during the meeting. The user performs an instruction operation on an "image capturing" button 311 using the input device 206 to send an image capturing request to the meeting apparatus 101. Upon receipt of the instruction operation on the "image capturing" button 311, the CPU 201 causes a screen 320 shown in FIG. 3C to be displayed on the display device 207.

An "agenda" button 312 is used by the user to instruct the meeting apparatus 101 to change (start or terminate) an item of agenda (topic discussed). Upon receipt of an instruction operation on the "agenda" button 312 via the input device 206, the CPU 201 causes a screen 330 shown in FIG. 3D to be displayed on the display device 207. An "end" button 313 is used by the user to instruct the meeting apparatus 101 to terminate recording of the meeting information. Upon receipt of an instruction operation on the "end" button 313 via the input device 206, the CPU 201 causes a screen 340 shown in FIG. 3E to be displayed on the display device 207.

Figure 3B:
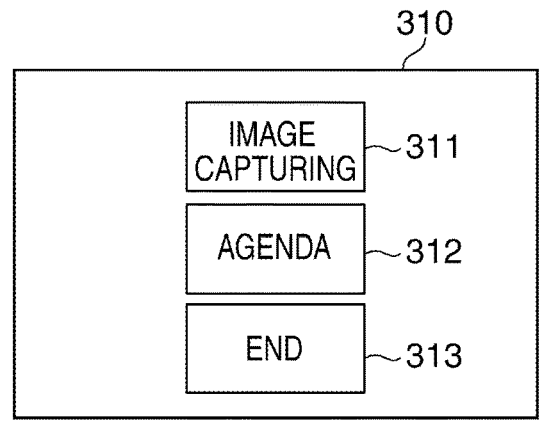
Figure 3C:
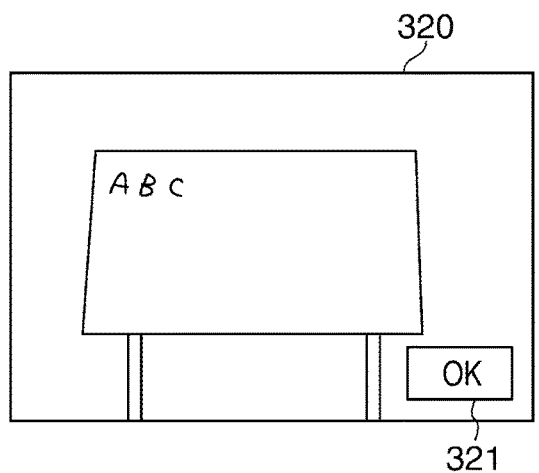

The screen 320 shown in FIG. 3C is a screen displayed when image capturing is performed. The screen 320 displays video of an object obtained by the camera device 209. The user can adjust the display such that a white board or paper on which characters are written is accommodated within an angle of view of the meeting apparatus 101, while viewing the displayed video. Upon receipt of an instruction operation on a desired point of the screen 320 via the input device 206, the CPU 201 controls the camera device 209 to capture an image of the object to thereby acquire image data. An "OK" button 321 is used by the user to instruct the meeting apparatus 101 to terminate image capturing. Upon receipt of an instruction operation on the "OK" button 321 via the input device 206, the CPU 201 causes the screen 310 (FIG. 3B) to be displayed on the display device 207.

The screen 330 (FIG. 3D) is a screen displayed when a change of the item of agenda is instructed. A text field 331 is used by the user to enter a name of the item of agenda and register the same with the meeting apparatus 101. The user can enter a desired name of the item of agenda in the text field 331 via the input device 206. A "start" button 332 is used by the user to instruct the meeting apparatus 101 to start a new item of agenda. An "end" button 333 is used by the user to instruct the meeting apparatus 101 to terminate the current item of agenda. Note that the name of the terminated item of agenda is displayed in a text area 334 as an item in a list. An "OK" button 335 is used by the user to instruct the meeting apparatus 101 to terminate changing the item of agenda. Upon receipt of an instruction operation on the "OK" button 335 via the input device 206, the CPU 201 causes the screen 310 (FIG. 3B) to be displayed on the display device 207.

Figure 3D:
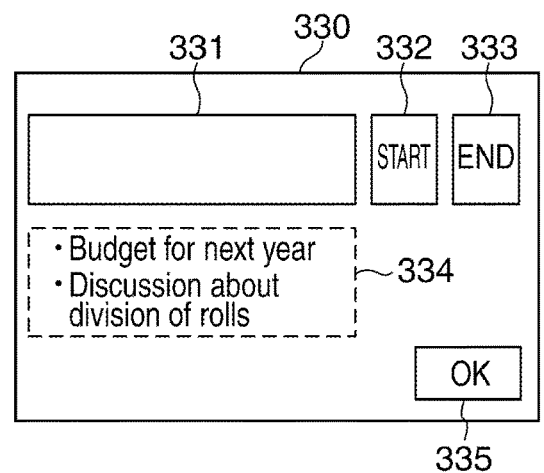
Figure 3E:
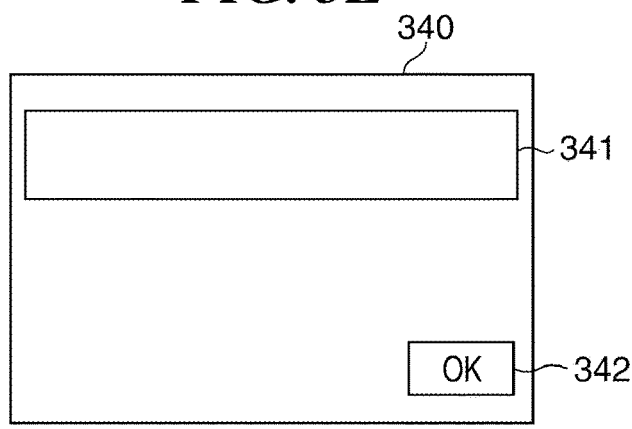

The screen 340 shown in FIG. 3E is a screen displayed when recording of the meeting information is terminated. A text field 341 is used by the user to designate a destination to which the meeting apparatus 101 should transmit data of minutes of a meeting generated thereby. The user can enter a desired transmission destination in the text field 341 via the input device 206. For example, a mail address is used as the transmission destination, but this is not limitative. An "OK" button 342 is used by the user to instruct the meeting apparatus 101 to finally determine termination of recording of the meeting information. Upon receipt of an instruction operation on the "OK" button 342 via the input device 206, the CPU 201 causes the screen 300 (FIG. 3A) to be displayed on the display device 207. Then, the meeting apparatus 101 terminates recording of the meeting information, and transmits the meeting information to the meeting server 102. After that, the meeting server 102 generates minutes of the meeting by analyzing and processing the received meeting information, and transmits the data of the generated minutes to the transmission destination.

Next, the meeting information recorded in the storage 205 by the meeting apparatus 101 will be described. FIGS. 4A, 4B, and 4C are diagrams showing examples of construction of a voice information table 400, an image information table 410, and an agenda information table 420, respectively. The meeting information is formed by these tables. The voice information table 400 (see FIG. 4A) is a data table for recording information associated with voice which the meeting apparatus 101 acquires by voice recording (hereinafter referred to as the "voice information"). The meeting apparatus 101 acquires voice data by voice recording of conversation during the meeting, and records the voice data. A voice recording start time (meeting start time) is recorded in a box of a voice recording start time column 401, and a voice recording end time (meeting end time) is recorded in a box of a voice recording end time column 402. A file name (including a path) of the voice data recorded in the storage 205 is recorded in a box of a voice data column 403.

The image information table 410 (see FIG. 4B) is a data table for recording information associated with an image acquired through image capturing by the meeting apparatus 101 (hereinafter referred to as the "image information"). The meeting apparatus 101 acquires image data by capturing an image of an object, and records the acquired image data in the storage 205 as a file. An image capturing time is recorded in a box of an image capturing time column 411, and a file name (including a path) of the image data recorded in the storage 205 is recorded in a box of an image data column 412. The agenda information table 420 (see FIG. 4C) is a data table for recording information associated with an item of agenda recorded by the meeting apparatus 101 (hereinafter referred to as the "agenda information"). A start time of the item of agenda is recorded in a box of an agenda item start time column 421, an end time of the item of agenda is recorded in a box of an agenda item end time column 422, and a name of the item of agenda is recorded in a box of an agenda item name column 423.

Figure 5A:
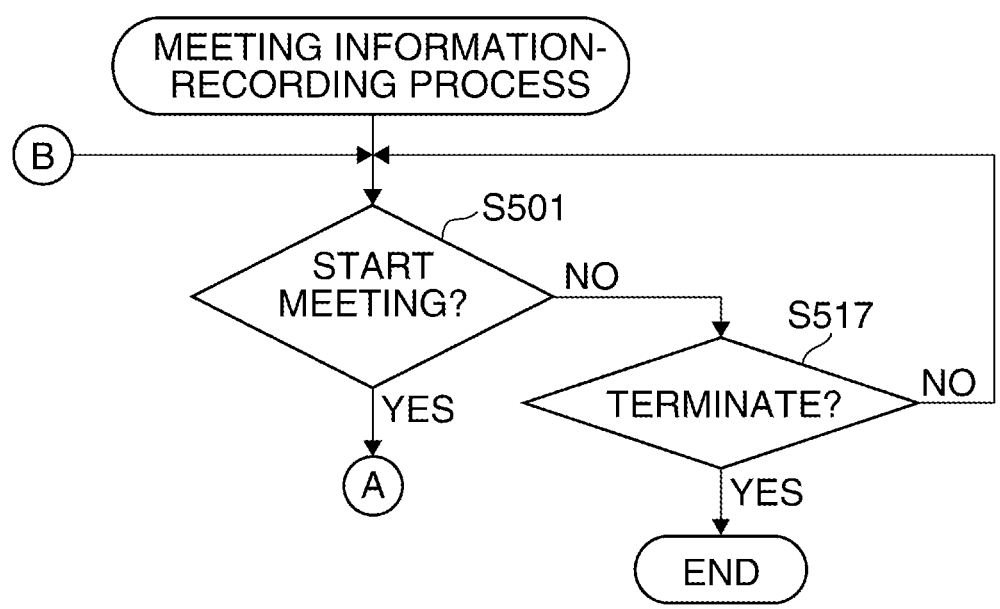
FIGS. 5A and 5B are a flowchart of a meeting information-recoding process.
Figure 5B:
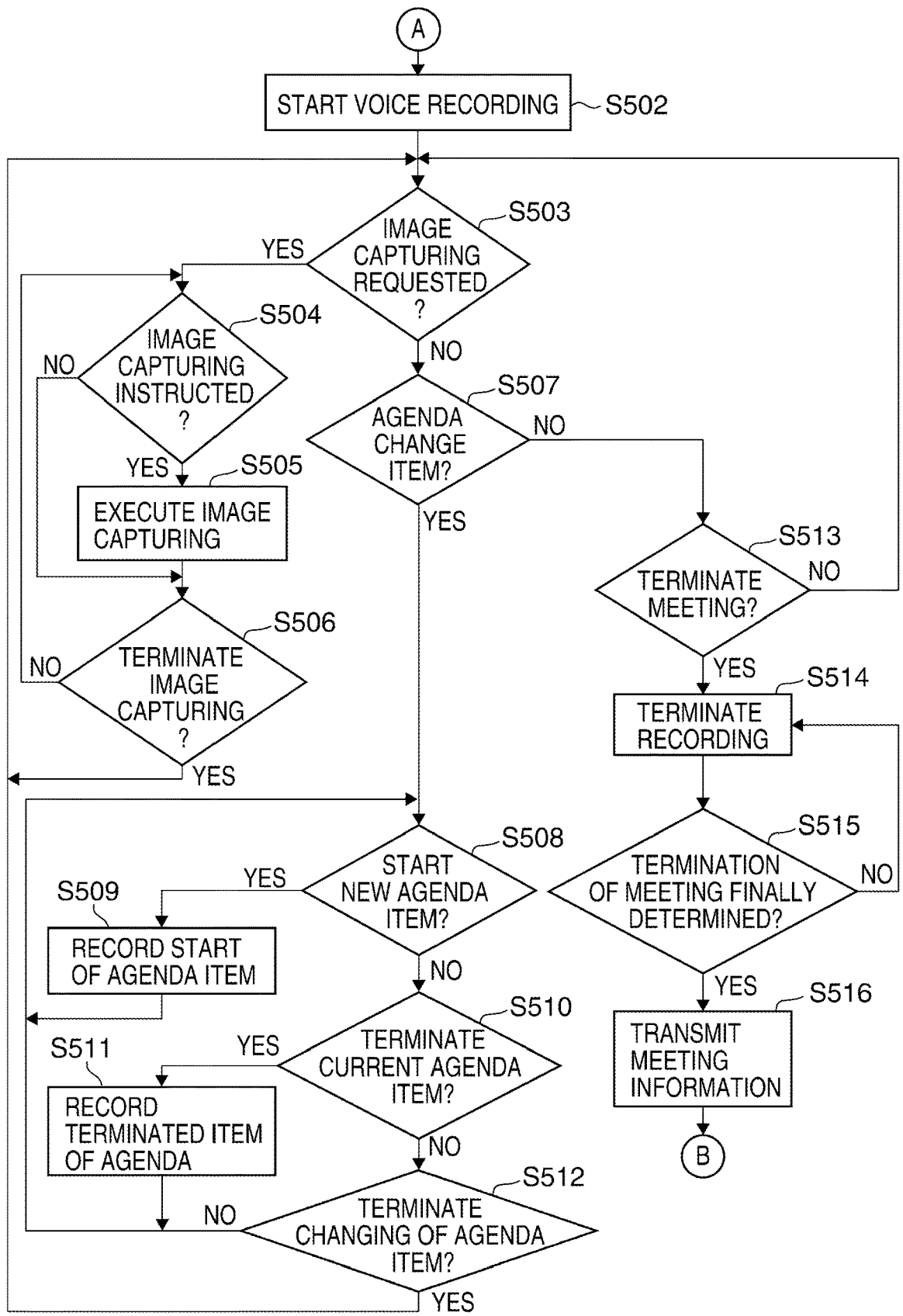

Next, a description will be given of a meeting information-recording process performed by the meeting apparatus 101. FIGS. 5A and 5B are a flowchart of the meeting information-recoding process. This process is realized by the CPU 201 that reads out the controller program stored in the storage 205, loads the program into the RAM 204, and executes the same. The present process is started when the user turns on the meeting apparatus 101 by operating a power key (not shown) of the meeting apparatus 101. When the present process is started, the CPU 201 generates display image data for the screen 300, and causes the screen 300 (FIG. 3A) to be displayed on the display device 207.

First, in a step S501, the CPU 201 determines whether or not a meeting start instruction has been provided by an instruction operation on the "start" button 301. If the meeting start instruction has not been provided, in a step S517, the CPU 201 determines whether or not a power-off instruction has been provided by operating the power key (not shown) of the meeting apparatus 101. If the power-off instruction has not been provided, the CPU 201 returns to the step S501, whereas if the power-off instruction has been provided, the CPU 201 terminates the meeting information-recording process in FIGS. 5A and 5B. If it is determined in the step S501 that the meeting start instruction has been provided, in a step S502, the CPU 201 generates display image data for the screen 310, causes the screen 310 (FIG. 3B) to be displayed on the display device 207, and starts to record conversation using the microphone device 210. With this, the CPU 201 starts to acquire voice data. In this step, the CPU 201 records the current time in a box of the voice recording start time column 401 of the voice information table 400 as the voice recording start time. Further, the CPU 201 starts to record the acquired voice data in the storage 205 as a file. The CPU 201 records the file name (including a path) of the voice data in a box of the voice data column 403 of the voice information table 400. Note that the voice recording start time corresponds to the meeting start time.

Next, in a step S503, the CPU 201 determines whether or not an image capturing request instruction has been provided by an instruction operation on the "image capturing" button 311. Therefore, it is possible to receive an instruction for acquiring image data from the user on the display screen during acquisition of voice. If the image capturing request instruction has not been provided, the CPU 201 proceeds to a step S507. On the other hand, if the image capturing request instruction has been provided, the CPU 201 proceeds to a step S504, wherein the CPU 201 generates display image data for the screen 320, causes the screen 320 (FIG. 3C) to be displayed on the display device 207, and determines whether or not an image capturing instruction has been provided. In this step, in a case where an instruction operation on a desired point on the screen 320 is received via the input device 206, the CPU 201 determines that the image capturing instruction has been provided. If the image capturing instruction has not been provided, the CPU 201 proceeds to a step S506, whereas if the image capturing instruction has been provided, the CPU 201 proceeds to a step S505, and starts to capture an image of an object using the camera device 209 to acquire image data. Further, the CPU 201 adds a record to the image information table 410 (FIG. 4B). At this time, the CPU 201 records the current time in a box of the image capturing time column 411 as the image capturing time. Further, the CPU 201 records the image data in the storage 205 as a file. The CPU 201 records the file name (including a path) of the image data in a box of the image data column 412 of the image information table 410. In the step S506, the CPU 201 determines whether or not an image capturing termination instruction has been provided by an instruction operation on the "OK" button 321. If the image capturing termination instruction has not been provided, the CPU 201 returns to the step S504. On the other hand, if the image capturing termination instruction has been provided, the CPU 201 returns to the step S503, generates the display image data for the screen 310, and causes the screen 310 (FIG. 3B) to be displayed on the display device 207. Further, in a case where a predetermined time period has elapsed after displaying the screen 320 without any instruction operation on any point, the CPU 201 also determines that image capturing is to be terminated, and causes the screen 310 to be displayed on the display device 207.

In the step S507, the CPU 201 determines whether or not an agenda item change instruction has been provided by an instruction operation on the "agenda" button 312 (FIG. 3B). If the agenda item change instruction has not been provided, the CPU 201 proceeds to a step S513. On the other hand, if the agenda item change instruction has been provided, the CPU 201 proceeds to a step S508, wherein the CPU 201 generates display image data for the screen 330, and causes the screen 330 (FIG. 3D) to be displayed on the display device 207.

In the step S508, the CPU 201 determines whether or not an agenda item start instruction has been newly provided by an instruction operation on the "start" button 332. If the agenda item start instruction has been newly provided, in a step S509, the CPU 201 starts the new item of agenda. More specifically, the CPU 201 adds a record in the agenda information table 420 (FIG. 4C), and records the current time in a box of the agenda item start time column 421 as an agenda item start time. After execution of the step S509, the process returns to the step S508. On the other hand, if it is determined in the step S508 that the agenda item start instruction has not been newly provided, the CPU 201 proceeds to a step S510. Note that in a case where there is an item of agenda which has been started in the step S509, and has not been terminated in a step S511, described hereinafter, the answer to the question of the step S508 is also negative (NO).

In the step S510, the CPU 201 determines whether or not an agenda item termination instruction has been provided by an instruction operation on the "end" button 333. If the agenda item termination instruction has not been provided, the CPU 201 proceeds to a step S512. Note that in a case where there is no item of agenda which has been started in the step S509, and has not been terminated in the step S511, the answer to the question of the step S510 is negative (NO). On the other hand, the agenda item termination instruction has been provided, in the step S511, the CPU 201 terminates the current item of agenda. More specifically, the CPU 201 records the current time in a box of the agenda item end time column 422 of the agenda information table 420 (see FIG. 4C) as an agenda item end time. Further, the CPU 201 records the name of the item of agenda input in the text field 331 in a box of the agenda item name column 423.

In the step S512, the CPU 201 determines whether or not an agenda change termination instruction has been provided by an instruction operation on the "OK" button 335. If the agenda change termination instruction has not been provided, the CPU 201 returns to the step S508. On the other hand, if the agenda change termination instruction has been provided, the CPU 201 returns to the step S503. At this time, the CPU 201 generates the display image data for the screen 310, and causes the screen 310 (see FIG. 3C) to be displayed on the display device 207.

Note that even in a case where the instruction operation on the "OK" button 335 (FIG. 3D) is performed without providing the termination instruction after starting the item of agenda, if the image capturing request is provided by an instruction operation on the "image capturing" button 311 (see FIG. 3B) in the step S503, it is possible to perform image capturing. After that, when an instruction operation on the "OK" button 335 is performed after performing an instruction operation on the "agenda" button 312 see FIG. 3B) and then an instruction operation on the "end" button 333 (FIG. 3D), the agenda item end time is recorded in a box of the agenda item end time column 422.

In the step S513, the CPU 201 determines whether or not a meeting termination instruction has been provided by an instruction operation on the "end" button 313. If the meeting termination instruction has not been provided, the CPU 201 returns to the step S503. On the other hand, if the meeting termination instruction has been provided, in a step S514, the CPU 201 generates the display image data for the screen 340, causes the screen 340 (FIG. 3E) to be displayed on the display device 207, and terminates voice recording of the meeting using the microphone device 210. At this time, the CPU 201 records the current time in a box of the voice recording end time column 402 of the voice information table 400 (FIG. 4A) as the voice recording end time. At this time, if the agenda information table 420 (FIG. 4C) contains any record without an end time recorded in an associated box of the agenda item end time column 422, the CPU 201 records the current time in the associated box of the agenda item end time column 422 as the agenda item end time. Further, in a case where there is no name of the item of agenda entered in the text field 331, the CPU 201 records a default name of the item of agenda in a box of the agenda item name column 423. Alternatively, the CPU 201 may prompt the user to enter a name of the item of agenda.

Next, in a step S515, the CPU 201 determines whether or not a finally determined meeting termination instruction has been provided. That is, if a transmission destination has been input in the text field 341, and an instruction operation on the "OK" button 342 has been performed, the CPU 201 determines that the finally determined meeting termination instruction has been provided. However, if no transmission destination has been input in the text field 341, or the instruction operation on the "OK" button 342 has not been performed, the CPU 201 determines that the finally determined meeting termination instruction has not been provided. The CPU 201 waits until the finally determined meeting termination instruction is provided, and when the finally determined meeting termination instruction has been provided, the CPU 201 proceeds to a step S516. Note that the transmission destination input in the text field 341 is recorded as part of the meeting information.

In the step S516, the CPU 201 transmits the meeting information recorded in the storage 205 by the above-described process to the meeting server 102 via the external interface 208, and returns to the step S501. At this time, the CPU 201 generates the display image data for the screen 300, and causes the screen 300 (see FIG. 3A) to be displayed on the display device 207. Note that the CPU 201 may delete the transmitted meeting information from the storage 205 after the transmission.

Note that voice recording and image capturing can be performed even during a time period from when an instruction operation is performed on the "start" button 301 on the screen 300 (FIG. 3A) to when an instruction operation is performed on the "start" button 332 on the screen 330 (FIG. 3D), and a time period from when an instruction operation is performed on the "end" button 333 to when an instruction operation is performed on the "end" button 313. Further, voice recording and image capturing can be performed even during a time period from when an instruction operation is performed on the "end" button 333 to when an instruction operation is performed on the "start" button 332 next time. These time periods are not recorded in the agenda information table 420, and therefore, meeting minutes source information and the meeting minutes are not generated from data acquired by voice recording and/or image capturing during these time periods.

However, the meeting minutes source information and the meeting minutes may be configured to be generated from data acquired by voice recording and/or image capturing during these time periods. In this case, the name of an item of agenda which is not started by the "start" button 332 on the screen 330 (see FIG. 3D) may be unnamed, or may be determined by default. A description will be given, by way of example, of the time period from when an instruction operation is performed on the "start" button 301 to when an instruction operation is performed on the "start" button 332 on the screen 330 (FIG. 3D). The CPU 201 records a time at which the instruction operation was performed on the "start" button 301 in a box of the agenda item start time column 421 of a first item of agenda. Then, the CPU 201 records a time at which the instruction operation was performed on the "start" button 332 thereafter in a box of the agenda item end time column 422 of the first item of agenda and also in a box of the agenda item start time column 421 of the next (second) item of agenda. Further, in a case where there is no name of the item of agenda entered in the text field 331 when executing the step S516, the CPU 201 may record a default name of the item of agenda in a box of the agenda item name column 423, or may cause the user to enter a name of the item of agenda.

Next, the meeting minutes source information will be described which the meeting server 102 generates by analyzing and manipulating the meeting information received from the meeting apparatus 101. FIGS. 6A to 6C and 7 are diagrams showing examples of construction of the meeting minutes source information recorded in the storage 255 by the meeting server 102. The meeting minutes source information includes a spoken information table 600 (see FIG. 6A), a written information table 610 (see FIG. 6B), a meeting text table 620 (see FIG. 6C), and a summary table 700 (see FIG. 7).

First, the spoken information table 600 (first text information) shown in FIG. 6A is a data table for recording information associated with a result of speech recognition on voice data included in the meeting information (hereinafter referred to as the "spoken information"). The CPU 251 identifies speech of a user by analyzing the voice data, and generates a record for each speech. A time at which the speech was generated (hereinafter referred to as the "speech time") is recorded in a box of a speech time column 601. A spoken text acquired by performing speech recognition is recorded in a box of a spoken text column 602. Identification of the speech and the speech time will be described hereinafter.

The written information table 610 (second text information) shown in FIG. 6B is a data table for recording information associated with a result of character recognition on image data included in the meeting information (hereinafter referred to as the "written information"). The CPU 251 identifies writing by a user by analyzing the image data, and generates a record for each writing. A time at which writing occurred (hereinafter referred to as the "writing time") is recorded in a box of a writing time column 611. A written text acquired by performing character recognition on image data is recorded in a box of written text column 612. Identification of the writing and the writing time will be described hereinafter.

The meeting text table 620 (integrated text information) shown in FIG. 6C is a data table for recording information (hereinafter referred to as the "meeting text information") on texts generated from a meeting (hereinafter referred to as the "meeting text(s)"). The CPU 251 integrates the spoken information and the written information to thereby generate the meeting text information. A time recorded in a box of the speech time column 601 or the writing time column 611 is recorded in a box of a generation time column 621 as a time at which the meeting text information was generated. A text recorded in a box of the spoken text column 602 or the written text column 612 is recorded in a box of a meeting text column 622 as a meeting text. In a box of a classification column 623, information is recorded which indicates whether the source of the meeting text (text before integration) recorded in an associated box of the meeting text column 622 is spoken information or written information. For example, if the text before integration is spoken information, a value of 0 is recorded in the box of the classification column 623, whereas if the text before integration is written information, a value of 1 is recorded in the box of the classification column 623. In a box of a main point column 624, information is recorded which indicates whether or not the meeting text in an associated box of the meeting text column 622 is a main point. Here, the term "main point" is intended to mean that information is on main contents of the meeting, such as decisions and actions. A method of determining a main point will be described hereinafter. If the meeting text is a main point, a value of 1 is recorded in a box of the main point column 624, whereas if not, a value of 0 is recorded in the same. Note that the CPU 251 sorts the records in the meeting text table 620 in the ascending order of the values of the generation time column 621 (in the order of generation).

The summary table 700 (see FIG. 7) is a data table for recording information acquired by summarizing the meeting texts (hereinafter referred to as the "summary information"). The CPU 251 generates a summary text by summarizing meeting texts recorded the meeting text column 622 of the meeting text table 620 for each item of agenda, and records the generated summary text in the summary table 700. A name of an item of agenda is recorded in a box of an agenda item name column 701. The generated summary text is recorded in an associated box of a summary text column 702 (summary information). The summary information (summary text information) is smaller in the number of characters than the spoken information and the written information.

Figure 8:
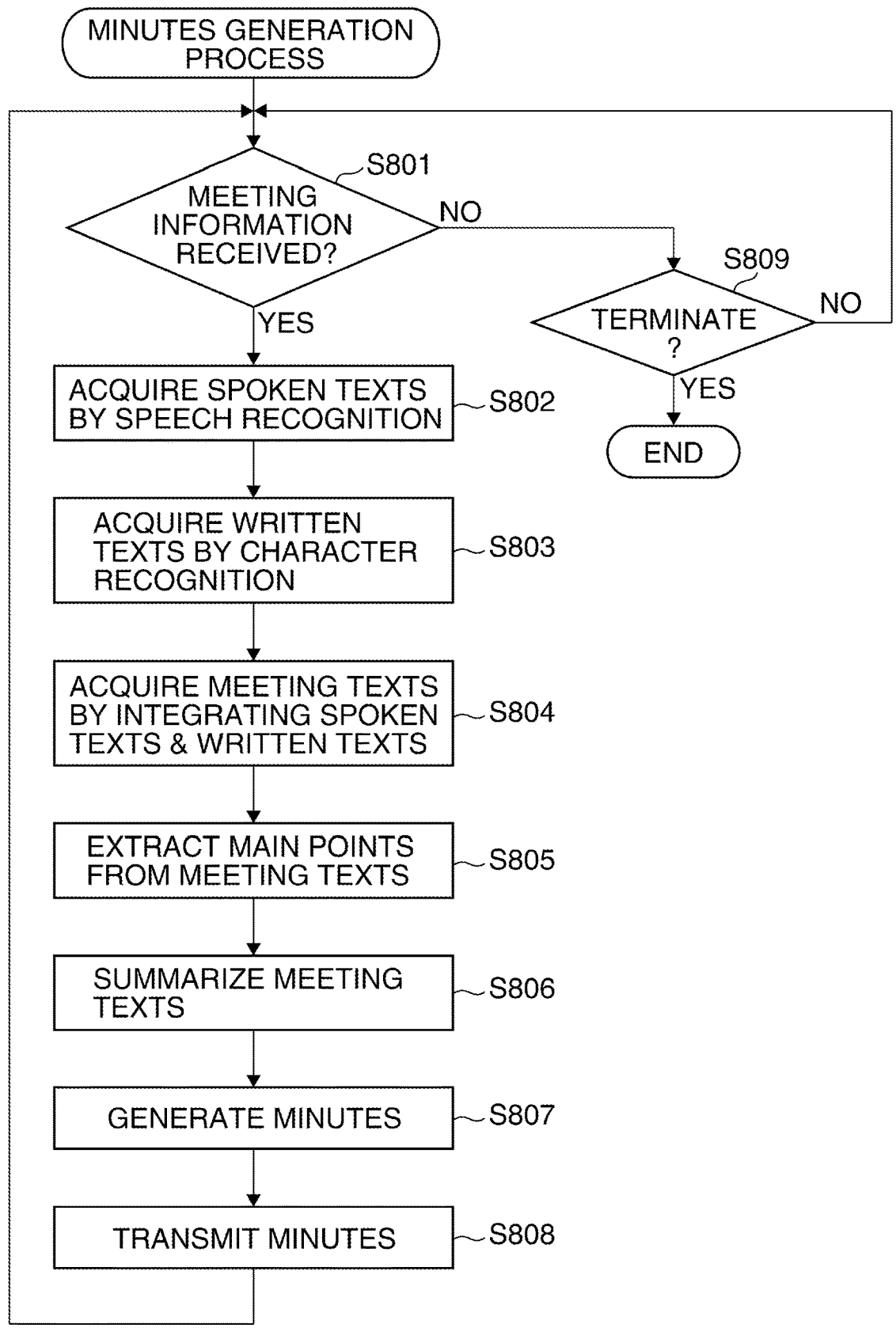
FIG. 8 is a flowchart of a meeting minutes generation process.

Next, a description will be given of a meeting minutes generation process performed by the meeting server 102 for generating minutes of a meeting (see FIG. 9) after generating the meeting minutes source information (see FIGS. 6A to 6C and 7). FIG. 8 is a flowchart of the meeting minutes generation process. This process is realized by the CPU 251 that reads out the meeting server program stored in the storage 255, loads the program into the RAM 254, and executes the same. The present process is started when the meeting server 102 is started. In the present process, the CPU 251 functions as a first generation unit, a second generation unit, an integration unit, and a summarization unit of the present invention.

First, in a step S801, the CPU 251 determines whether or not the meeting information (FIGS. 4A to 4C) has been received from the meeting apparatus 101 via the external interface 258. If the meeting information has not been received, the CPU 251 proceeds to a step S809, whereas if the meeting information has been received, the CPU 251 proceeds to a step S802, wherein the CPU 251 performs speech recognition on voice data included in the received meeting information, and acquires spoken texts. In this step, the CPU 251 scans the voice data from the start thereof, and performs the following processing: The CPU 251 detects a soundless section from the voice data. The soundless section can be detected based on the fact that a state in which the sound pressure of the voice data is not higher than a threshold value continues for a predetermined time period. The CPU 251 sets a section between one soundless section and the next soundless section as a speech section, and acquires a spoken text by performing speech recognition on each speech section. Further, the CPU 251 calculates a speech time of each speech section based on a voice recording start time in the voice recording start time column 401 of the voice information table 400 of the meeting information and a position of the speech section in the voice data in terms of a time period elapsed from the leading end of the voice data. The CPU 251 generates (adds) a record in the spoken information table 600 for each speech section thus acquired. Then, the CPU 251 records the speech time and the spoken text in respective associated boxes of the speech time column 601 and the spoken text column 602.

Next, in a step S803, the CPU 251 performs character recognition on the image data included in the received meeting information, and thereby acquires written texts. In this step, the CPU 251 sequentially scans the records of the image information table 410 included in the meeting information, and performs the following processing: The CPU 251 sorts the records of the image information table 410 in the ascending order of the values of the image capturing time column 411 (in the image capturing order). The CPU 251 acquires an image difference between image data in a box of the image data column 412 of a record of current interest and image data in a box of the image data column 412 of the immediately preceding record. This image difference can be regarded as a partial image including characters entered by a user during a time period from the time of capturing the image data of the immediately preceding record to the time of capturing the image data of the record of current interest. The CPU 251 performs character recognition on the partial image, and thereby acquires a written text. Further, the CPU 251 sets the image capturing time recorded in a box of the image capturing time column 411 of the record of current interest as a time at which the image difference was generated, i.e. a writing time at which the user entered the characters. The CPU 251 generates (adds) a record in the written information table 610 for each image difference (writing) thus acquired. Then, the CPU 251 records the writing time and the written text in associated boxes of the writing time column 611 and the written text column 612, respectively.

In a step S804, the CPU 251 integrates the spoken texts and the written texts to thereby acquire meeting texts. More specifically, the CPU 251 integrates the spoken information table 600 generated in the step S802 and the written information table 610 generated in the step S803 to thereby generate the meeting text table 620 (see FIG. 6C). In this step, the CPU 251 performs the following processing: The CPU 251 adds to the meeting text table 620 records corresponding in number to the number of records included in the spoken information table 600. At this time, the CPU 251 records a speech time recorded in each box of the speech time column 601 in an associated box of the generation time column 621 as a time at which a meeting text was generated, and records a spoken text recorded in an associated box of the spoken text column 602 in an associated box of the meeting text column 622 as a meeting text. The CPU 251 records a value of 0 indicating that the original data is spoken information, in an associated box of the classification column 623. Further, the CPU 251 adds to the meeting text table 620 records corresponding in number to the number of records included in the written information table 610. At this time, the CPU 251 records a writing time recorded in each box of the writing time column 611 in an associated box of the generation time column 621 as a time at which a meeting text was generated, and records a written text recorded in an associated box of the written text column 612 in an associated box of the meeting text column 622 as a meeting text. The CPU 251 records a value of 1 indicating that the original data is written information, in an associated box of the classification column 623. The CPU 251 sorts the records thus added in the ascending order of the respective values in the boxes of the generation time column 621 (in the order of generation).

In a step S805, the CPU 251 extracts main points from the meeting texts generated in the step S804. In this step, first, as to each record added to the meeting text table 620 in the step S804, the CPU 251 determines whether or not a meeting text in each associated box of the meeting text column 622 is a main point. For example, if the meeting text includes a predetermined specific key word, the CPU 251 determines that the meeting text is a main point. If the meeting text is a main point, the CPU 251 records a value of 1 in an associated box of the main point column 624, whereas if not, the CPU 251 records a value of 0 in the associated box of the main point column 624.

In a step S806, the CPU 251 summarizes the meeting texts generated in the step S804. The CPU 251 sequentially scans the records in the agenda information table 420 of the meeting information, and performs the following processing: The CPU 251 sorts the records in the agenda information table 420 (see FIG. 4C) in the ascending order of the respective values of the boxes of the agenda item start time column 421 (in the agenda item starting order). The CPU 251 acquires a time period from the agenda item start time in a box of the agenda item start time column 421 of a record of current interest to the agenda item end time in an associated box of the agenda item end time column 422 of the record. That is, each item of agenda is associated with the time period. Then, the CPU 251 extracts a group of records each having a value within the acquired time period in an associated box of the generation time column 621. The CPU 251 summarizes meeting texts in the associated boxes of the meeting text column 622 of the extracted record group, and thereby generates summary texts. A process for generating the summary texts will be described hereinafter with reference to FIG. 10A. Then, the CPU 251 adds a record to the summary table 700, and records the generated summary text in a box of the summary text column 702. Further, the CPU 251 records the name of the item of agenda recorded in the box of the agenda item name column 423 of the record of current interest in the agenda information table 420 in an associated box of the agenda item name column 701 of the record added to the summary table 700.

Figure 9:
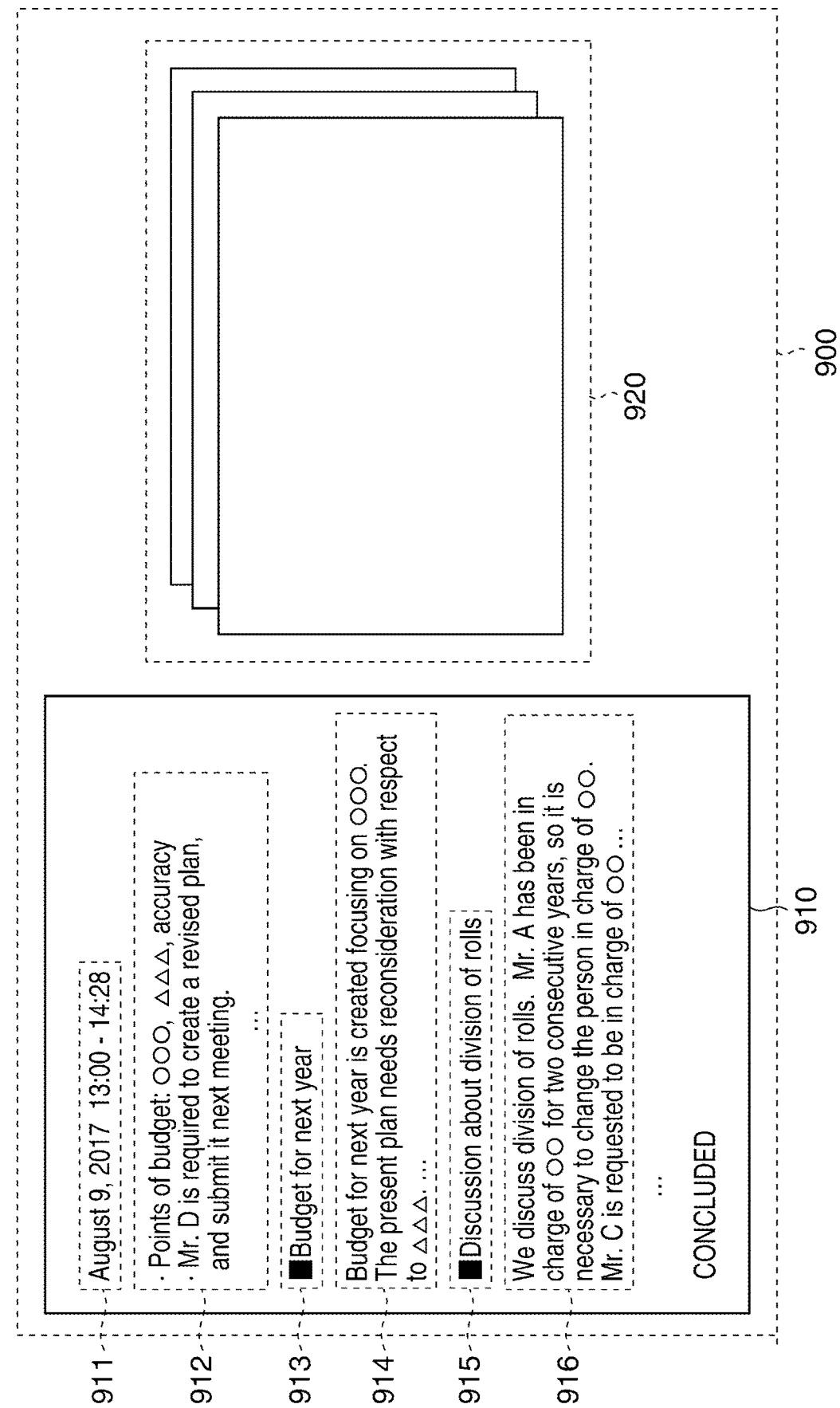
FIG. 9 is a diagram showing an example of minutes of a meeting.

In a step S807, the CPU 251 generates minutes of a meeting shown in FIG. 9 based on the meeting minutes source information and the meeting information, acquired as described above. FIG. 9 is a diagram showing an example of meeting minutes 900. The meeting minutes 900 are formed by proceedings text data 910 indicative of proceedings and an image data group 920. The proceedings text data 910 includes a meeting held time 911, a main point list 912, agenda item names 913 and 915, and summary texts 914 and 916.

The CPU 521 generates data of the meeting held time 911 based on the voice recording start time (meeting start time) in a box of the voice recording start time column 401 and the voice recording end time (meeting end time) in an associated box of the voice recording end time column 402 of the voice information table 400. The main point list 912 is a list of records included in the meeting text table 620, which are meeting texts in respective boxes of the meeting text column 622 of records each having a value of 1 (indicative of a main point) in an associated box of the main point column 624. The agenda item names 913 and 915 are acquired from respective boxes of the agenda item name column 701 of the summary table 700. The summary text 914 and the summary text 916 are summaries of meeting texts corresponding to the agenda item names 913 and 915, and are acquired from the boxes of the summary text column 702 of the summary table 700. The image data group 920 includes image data included in the meeting information.

In a step S808, the CPU 251 transmits the meeting minutes to the transmission destination included in the meeting information, and returns to the step S801. The method of transmitting the meeting minutes includes a method transmission using E-mail, by way of example. The CPU 251 enters the proceedings text data 910 in a body of the E-mail, and adds the image data group 920 as an attached file, and then transmits the E-mail.

In the step S809, the CPU 251 determines whether or not a termination instruction has been provided. The user can provide an instruction for terminating the meeting server 102 from a separate PC e.g. via the external interface 258. If the termination instruction has not been provided, the CPU 251 returns to the step S801, whereas if the termination instruction has been provided, the CPU 251 terminates the meeting minutes generation process in FIG. 8.

Figure 10A:
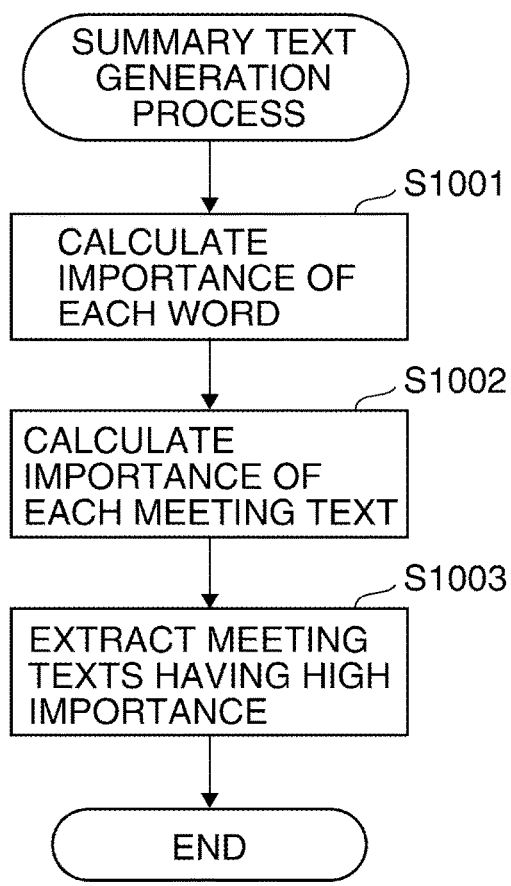
FIG. 10A is a flowchart of a summary text generation process.

The processing for summarizing the meeting texts in the step S806 will be described with reference to FIG. 10A. FIG. 10A is a flowchart of a summary text generation process. This summary text generation process corresponds to part of the processing for summarizing the meeting texts in the step S806. Before starting the summary text generation process, a plurality of records in the meeting text table 620 are input.

In a step S1001, the CPU 251 refers to all of the input records, and calculates the importance of each word appearing in the meeting text in each box of the meeting text column 622. For example, the CPU 251 calculates the importance of each word based on the appearance frequency of each word. As the appearance frequency is higher, the word has higher importance, and the importance is expressed e.g. by a value. In a step S1002, the CPU 251 calculates the importance of the meeting text in a box of the meeting text column 622 of each input record. More specifically, the CPU 251 calculates a value of the importance of each meeting text, by referring to the importance of each word calculated in the step S1001, and calculating a total value of the importance of words included in each meeting text. In a step S1003, the CPU 251 extracts meeting texts each having a value of the importance not smaller than a predetermined threshold value as meeting texts having high importance. With this, a meeting text to be extracted is determined based on the appearance frequency of each word included in a box of the meeting text table 620, and the determined meeting text is extracted. Then, the CPU 251 acquires summary texts in the summary table 700 (FIG. 7) from the extracted meeting texts.

Note that the method of summarizing the meeting texts in the step S806 is not limited to the one described above with reference to FIG. 10A. For example, in a meeting, a user sometimes enters a point of discussion and an important opinion in a writing medium, such as a white board. These contents are normally important as the proceedings, and hence written texts acquired from the writing medium may be preferentially reflected on the summary texts. For example, in the step S1003, the CPU 251 checks a value in a box of in the classification column 623 of each input record. If the value is equal to 1 (indicating that the source is written information), the CPU 251 may extract the meeting text in a box of the meeting text column 622 of the record as part of the summary text regardless of whether or not the importance value is not smaller than the threshold value.

Figure 10B:
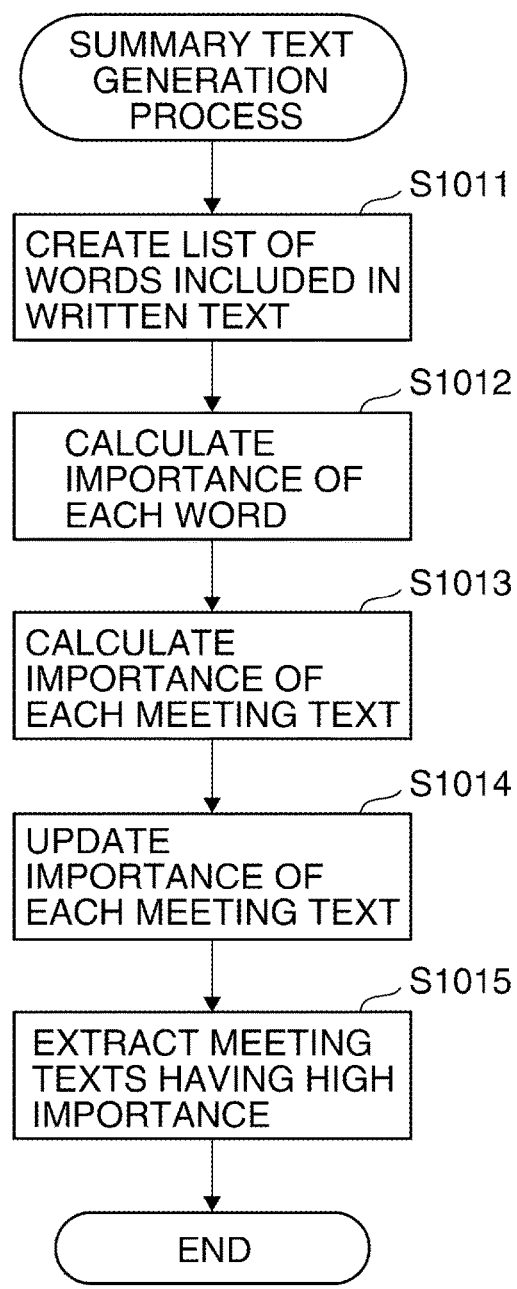
FIG. 10B is a flowchart of a variation of the summary text generation process.

As an example of processing for preferentially reflecting the written texts on the summary texts, a variation of the summary text generation process in FIG. 10B may be performed instead of the summary text generation process in FIG. 10A. FIG. 10B is a flowchart of the variation of the summary text generation process. Similar to the summary text generation process in FIG. 10A, before starting the variation of the summary text generation process in FIG. 10B, a plurality of records in the meeting text table 620 are input.

In a step S1011, the CPU 251 refers to records each having a value of 1 (indicating that the source is written information) in the classification record, out of the input records, and creates a list of words included in meeting texts in the boxes of the meeting text column 622 (hereinafter referred to as the "written word list"). In steps S1012 and S1013, the CPU 251 performs the same processing as performed in the steps S1001 and S1002 in FIG. 10A.

In a step S1014, the CPU 251 refers to the written word list created in the step S1011, and updates the importance of each meeting text calculated in the step S1013. More specifically, in a case where any word included in the written word list is included in a meeting text in a box of the meeting text column 622 of each input record, a bias (weight) is given to the importance of the corresponding meeting text to thereby increase e.g. the value of importance. At this time, the CPU 251 may increase weight according to the number of words, included in the meeting text, of the written word list. In a step S1015, the CPU 251 performs the same processing as performed in the step S1003.

Note that in a case where a meeting text of interest includes any word of the written word list in the step S1014, the CPU 251 may apply the maximum value of the importance so as to cause the meeting text of interest to be necessarily extracted as part of a summary text. In this case, out of the meeting texts, ones generated from the written texts are all extracted.

Note that when the CPU 251 generates the summary table 700 by summarizing the meeting texts in the step S806, the CPU 251 may extract all meeting texts including a predetermined word from the meeting texts in the boxes of the meeting text column 622 of the meeting text table 620.

According to the present embodiment, the meeting server 102 generates the spoken information table 600 by converting voice data to texts, and generates the written information table 610 by converting image data to texts. Then, the meeting server 102 integrates the spoken information table 600 and the written information table 610 to thereby generate the meeting text table 620. Further, the meeting server 102 generates the summary table 700 by summarizing the meeting text table 620, and generates minutes based on the summary table 700 and so forth. This makes it possible to perform summarization based on both of the voice data and the image data, and hence it is possible to obtain summaries from both of voice and images. Since the meeting minutes are generated based on these summaries, it is possible to generate the meeting minutes by reducing loss of information.

Note that the CPU 251 may display the meeting minutes source information (see FIGS. 6A to 6C, and 7) on the display device 257. Further, the meeting server 102 may be configured to be capable of changing each record from the displayed meeting minutes source information according to a user's instruction, i.e. edit the contents of each record, and add or delete a record.

Next, a description will be given of a second embodiment of the present invention. In the second embodiment, the meeting minutes are generated by further using displayed contents of an electronic material, etc., used in a meeting. The present embodiment will be described further with reference to FIGS. 11 to 13.

Figure 11:
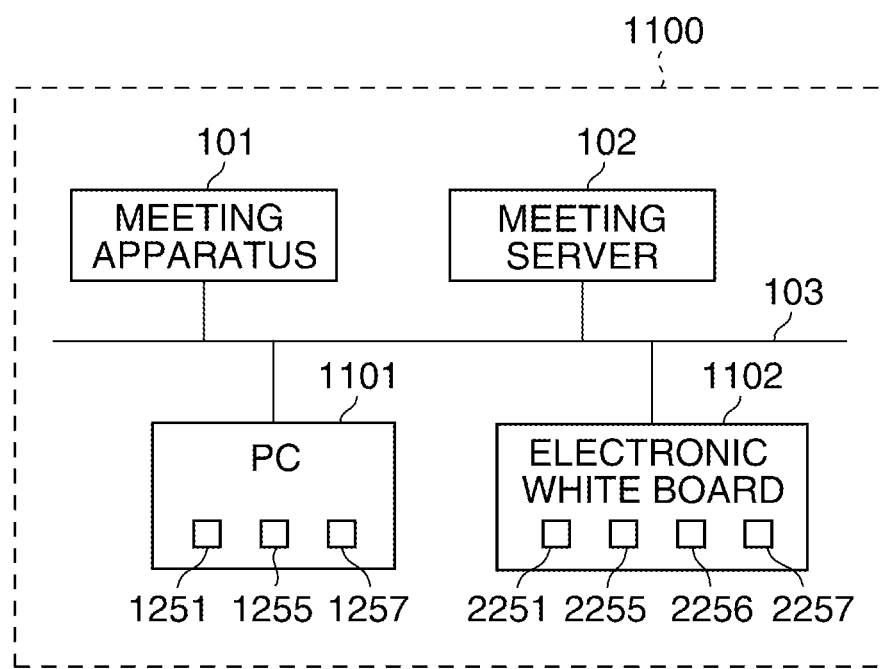
FIG. 11 is an entire configuration diagram of a meeting system including a meeting server as a summarization apparatus according to a second embodiment of the present invention.

FIG. 11 is an entire configuration diagram of a meeting system according to the present invention. This meeting system, denoted by reference numeral 1100, includes not only the meeting apparatus 101 and the meeting server 102, but also a PC 1101 and an electronic white board 1102. These components are interconnected via the network 103. The configurations of the meeting apparatus 101, the meeting server 102, and the network 103 are the same as those described in the first embodiment.

The PC 1101 is a general desktop PC (personal computer) or a laptop PC, and is capable of executing application programs, and displaying electronic materials to be referred to in a meeting on a display thereof. Note that a projector may be connected to the PC 1101, and the displayed contents may be projected by the projector. When the displayed contents are updated according e.g. to a user's instruction, the PC 1101 transmits the display image data to the meeting apparatus 101. On the electronic white board 1102, a user can electronically enter characters using e.g. a stylus pen. When the user enters contents, the electronic white board 1102 transmits the display image data including the written contents to the meeting apparatus 101.

The hardware configuration of the PC 1101 is basically the same as that of the meeting server 102. In the PC 1101, electronic materials and an application program for displaying the electronic materials are recorded in a storage 1255. Further, in the storage 1255, an application program for causing the user to input a text, and creating an electronic material is stored. A CPU 1251 interprets the electronic materials by executing the application program on the OS, and generates display image data for displaying the electronic materials. Then, the CPU 1251 displays the generated display image data on a display device 1257.

Although the hardware configuration of the electronic white board 1102 is similar to that of the meeting server 102, an input device 2256 of the electronic white board 1102 is equipped with a touch panel. This enables the user to electronically enter characters using e.g. a separate stylus pen. In the electronic white board 1102, an electronic white board program which provides a function as the electronic white board is recorded in a storage 2255. A CPU 2251 acquires contents entered by the user via the input device 2256, and generates display image data corresponding to the written contents by executing the electronic white board program on the OS. Then, the CPU 2251 displays the generated display image data on a display device 2257.

Next, the meeting information recorded by the meeting apparatus 101 will be described. FIGS. 12A and 12B are diagrams showing examples of construction of the meeting information (third text information), recorded in the storage 205 by the meeting apparatus 101. FIGS. 12A and 12B show a displayed image table 1200 and an electronic writing image table 1210, respectively. In the present embodiment, the meeting apparatus 101 records not only the voice information table 400, the image information table 410, and the agenda information table 420, but also the displayed image table 1200 and the electronic writing image table 1210 as the meeting information.

The displayed image table 1200 is a data table for recording information associated with display image data displayed by the PC 1101 (hereinafter referred to as the "displayed image information"). The meeting apparatus 101 receives the display image data from the PC 1101 via the external interface 208, and records the received data in the storage 205 as a file. The meeting apparatus 101 records the reception time of the display image data in a box of a display time column 1201 as the display time, and records a file name (including a path) of the display image data recorded in the storage 205 in an associated box of a display image data column 1202.

The electronic writing image table 1210 is a data table for recording information (hereinafter referred to as the "electronically written image information") associated with display image data (hereinafter referred to as the "electronically written image data") displayed by the electronic white board 1102, including the contents entered by the user. The meeting apparatus 101 receives the display image data (electronically written image data) from the electronic white board 1102 via the external interface 208, and records the received data in the storage 205 as a file. The meeting apparatus 101 records the reception time of the electronically written image data in a box of the writing time column 1211 as the writing time, and records a file name (including a path) of the electronically written image data recorded in the storage 205 in an associated box of an electronically written image data column 1212.

Figure 13A:
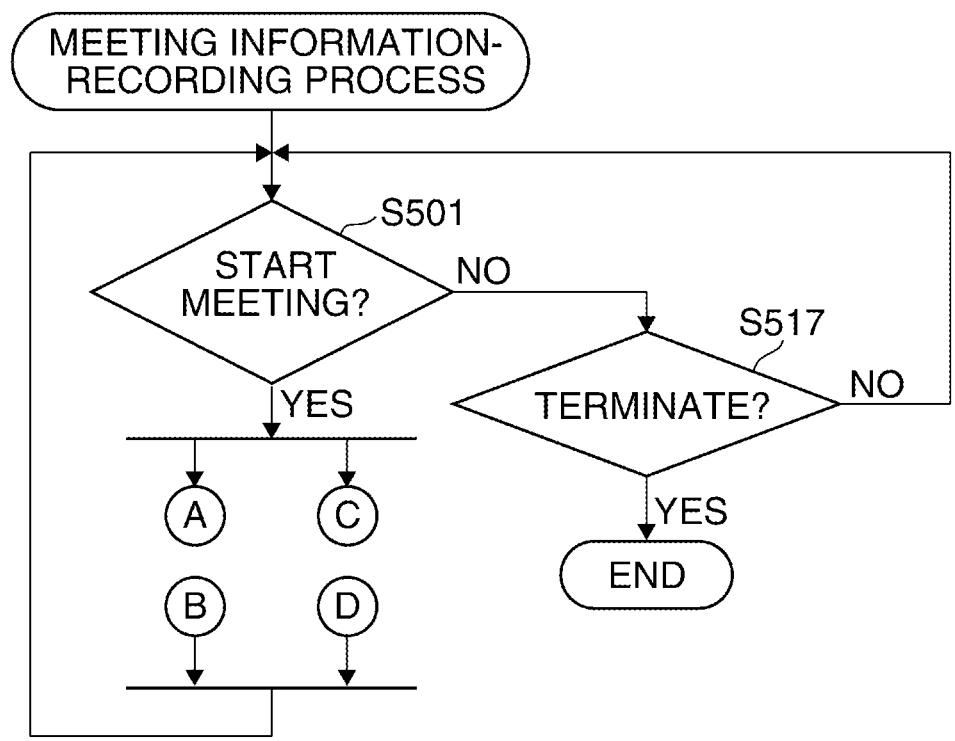
FIGS. 13A and 13B are a flowchart of a meeting information-recoding process.
Figure 13B:
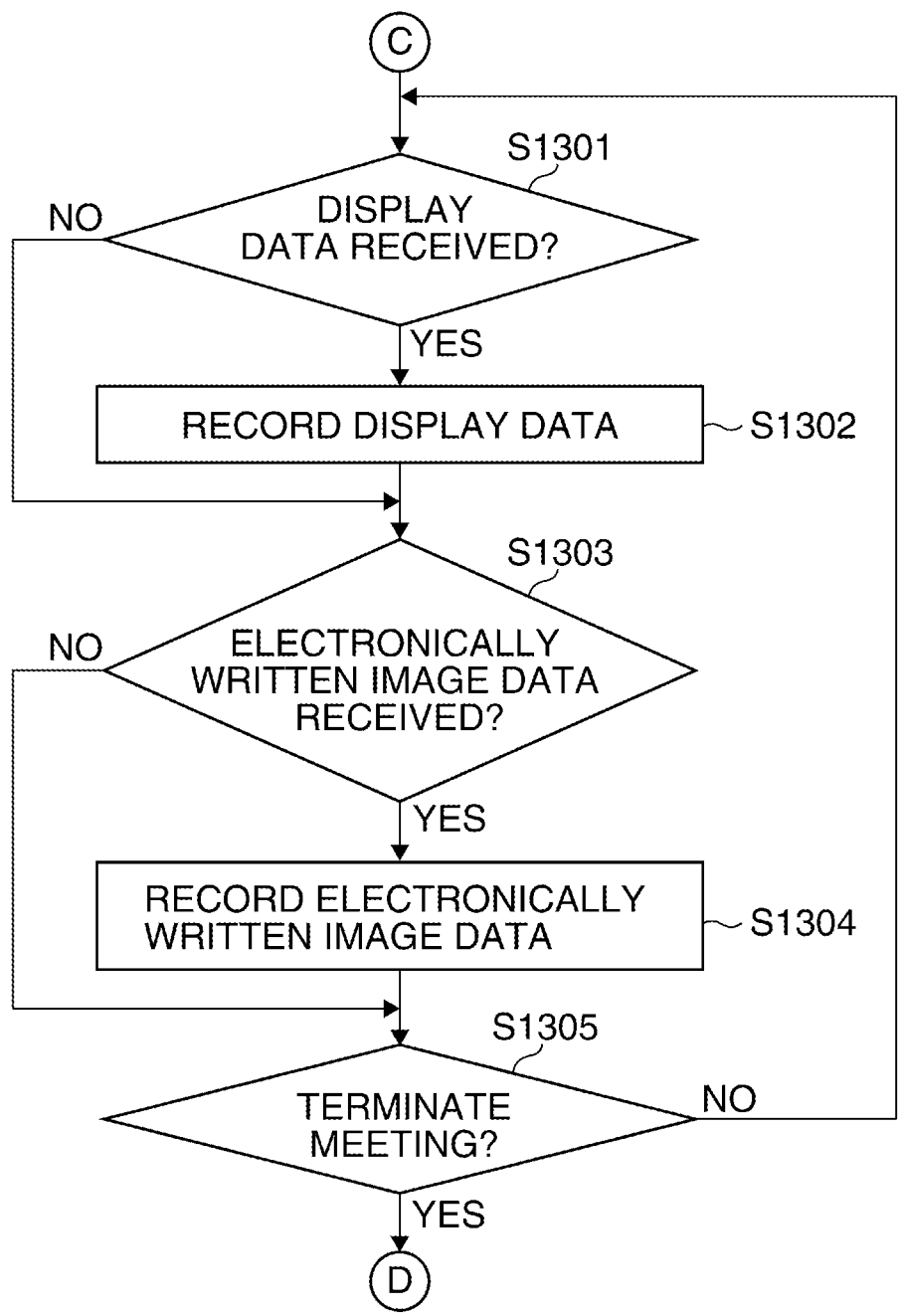

Next, a meeting information-recoding process performed by the meeting apparatus 101 will be described. FIGS. 13A and 13B are a flowchart of the meeting information-recoding process. This process is realized by the CPU 201 that reads out the controller program stored in the storage 205, loads the program into the RAM 204, and executes the same. The present process is started when the user powers on the meeting apparatus 101 by operating the power key (not shown) of the meeting apparatus 101. When the present process is started, the CPU 201 generates display image data for the screen 300 (see FIG. 3A), and causes the screen 300 to be displayed on the display device 207.

First, the step S501 is the same as that described with reference to FIG. 5A. If it is determined in the step S501 that a meeting start instruction has not been provided, in the step S517, the CPU 201 determines whether or not a power-off instruction has been provided by operating the power key (not shown). If the power-off instruction has not been provided, the CPU 201 returns to the step S501, whereas if the power-off instruction has been provided, the CPU 201 terminates the meeting information-recording process in FIGS. 13A and 13B. If it is determined in the step S501 that the meeting start instruction has been provided, the CPU 201 executes the same processing as performed in the steps S502 to S516 in FIG. 5B, and steps S1301 to S1305 in FIG. 13B in parallel. After execution of the step S516, the CPU 201 returns to the step S501 in FIG. 13A.

In the step S1301, the CPU 201 determines whether or not display image data has been received from the PC 1101 via the external interface 208. If display image data has not been received, the CPU 201 proceeds to a step S1303, whereas if display image data has been received, the CPU 201 proceeds to the step S1303 after executing a step S1302. In the step S1302, the CPU 201 records the received display image data in the storage 205 as a file. More specifically, the CPU 201 adds a record to the displayed image table 1200 (see FIG. 12A), records the current time in an associated box of the display time column 1201 as the display time, and records the file name (including a path) of the display image data in an associated box of the display image data column 1202.

In the step S1303, the CPU 201 determines whether or not electronically written image data has been received from the electronic white board 1102 via the external interface 208. If the electronically written image data has not been received, the CPU 201 proceeds to the step S1305, whereas if the electronically written image data has been received, the CPU 201 proceeds to the step S1305 after executing a step S1304.

In the step S1304, the CPU 201 records the received electronically written image data in the storage 205 as a file. More specifically, the CPU 201 adds a record to the electronic writing image table 1210 (see FIG. 12B), records the current time in an associated box of the writing time column 1211 as the writing time, and records the file name (including a path) of the electronically written image data in an associated box of the electronically written image data column 1212.

In the step S1305, the CPU 201 determines whether or not a meeting termination instruction has been provided, similar to the step S513 in FIG. 5B. If the meeting termination instruction has not been provided, the CPU 201 returns to the step S1301, whereas if the meeting termination instruction has been provided, the CPU 201 returns to the step S501 in FIG. 13A. Note that the displayed image information and the electronically written image information are recorded as part of the meeting information, and hence these information items are included in the meeting information transmitted to the meeting server 102 in the step S516 in FIG. 5B.

Next, a meeting minutes generation process performed by the meeting server 102 for generating minutes will be described. The meeting minutes generation process performed by the meeting server 102 in the present embodiment is basically the same as the meeting minutes generation process of the first embodiment, described with reference to FIG. 8, and hence the description is mainly given of different points with reference to FIG. 8.

In the step S803, the CPU 251 acquires written texts by performing character recognition not only on image data included in the received meeting information, but also on the electronically written image data. Further, the CPU 251 sequentially scans the records in the electronic writing image table 1210 included in the meeting information, and performs the following processing: The CPU 251 sorts the records in the electronic writing image table 1210 in the ascending order of the values of the writing time column 1211 (in the written order). The CPU 251 acquires an image difference between the electronically written image data indicated in a box of the electronically written image data column 1212 of the record of current interest and electronically written image data indicated in a box of the electronically written image data column 1212 of the immediately preceding record. This image difference can be regarded as a partial image including characters entered by the user during a time period from the time of writing the electronically written image data of the immediately preceding record to the time of writing the electronically written image data of the record of current interest. The CPU 251 performs character recognition on this partial image, and thereby acquires written texts. Further, the CPU 251 sets the writing time in a box of the writing time column 1211 of the record of current interest as a time at which the image difference was generated, i.e. a writing time at which the user entered characters. The CPU 251 generates (adds) a record in the written information table 610 for each image difference (writing) thus acquired. Then, the CPU 251 records the writing time and the written text in boxes of the writing time column 611 and the written text column 612, respectively.

When generating the meeting minutes in the step S807, the CPU 251 causes not only the image data included in the meeting information but also the display image data to be included in the image data group 920.

According to the present embodiment, it is possible to cause the contents of the electronic material referred to in the meeting to be included in the meeting minutes as images. Further, it is possible to generate written texts also based on contents electronically written using e.g. the electronic white board, and generate meeting minutes by integrating the generated written texts and the spoken texts. Therefore, it is possible to obtain the same advantageous effects as provided by the first embodiment, for generating meeting minutes by obtaining summaries from both of voice and images with reduced loss of information.

In the present embodiment, the contents entered on the electronic white board 1102 are received by the meeting apparatus 101 as image data (electronically written image data). However, the system may be configured such that the electronic white board 1102 recognizes strokes of writing and converts written contents to text data, and the meeting apparatus 101 receives the text data and causes the text data to be included in the meeting information. The meeting server 102 can input the received text data to the meeting text table 620 as written texts.

The display image data of the PC 1101 and the electronically written image data of the electronic white board 1102 are received by the meeting apparatus 101, and the meeting apparatus 101 transmits the received data to the meeting server 102. However, these data items may be transmitted directly to the meeting server 102 by the PC 1101 and the electronic white board 1102.

In the step S803 of the meeting minutes generation process, the CPU 251 may perform character recognition on the display image data received from the PC 1101, and input a text acquired as a result of the character recognition in the meeting text table 620 as a meeting text. In this case, the CPU 251 records a value of 0 in an associated box of the classification column 623 (see FIG. 6C) of the record which records the input meeting text. Therefore, each meeting text generated based on the display image data received from the PC 1101 is treated equivalent to a spoken text.

Note that each meeting text generated based on the display image data received from the PC 1101 may be treated as either a written text or a spoken text according to a type of the electric material displayed on the PC 1101. For example, an electronic material, such as a material generated using Power Point (registered trademark) may be treated as a spoken text, and an electronic material, such as a material generated using Word (registered trademark) may be treated as a written text.

Although the PC 1101 and the electronic white board 1102 are described as the terminal units provided separately from the meeting apparatus 101 by way of example, this is not limitative, but the terminal unit may be any apparatus insofar as it electronically inputs data and transmits the input data to the meeting apparatus 101.

Next, a description will be given of a third embodiment of the present invention. In the third embodiment, generation of meeting minutes based on moving image data acquired by capturing image of scenes of a meeting, etc., will be described. In the present embodiment, the meeting server 102 receives moving image data from a separate device, and generates meeting information based on the received moving image data. Therefore, the meeting apparatus 101 is not necessarily required to be provided. The device that transmits moving image data to the meeting server 102 may be the meeting apparatus 101, or another device. In the present example, the description is given assuming that the transmission source of moving image data is another device separate from the meeting apparatus 101.

Note that the moving image data in the present embodiment is data acquired by capturing images of a meeting or the like, and includes video data containing an image of a writing medium, such as a white board, as an object image, voice data obtained by recording user's speech, and chapter data indicative of a change of an item of agenda. The meeting server 102 analyzes and processes the received moving image data, generates the meeting information shown in FIGS. 4A to 4C, and stores the generated meeting information in the storage 255. Then, the meeting server 102 generates the meeting minutes source information shown in FIGS. 6A to 6C and 7 based on the generated meeting information, and then generates the meeting minutes (see FIG. 9). The following description will be given of generation of the meeting minutes with reference to FIGS. 14 and 15.

Figure 14:
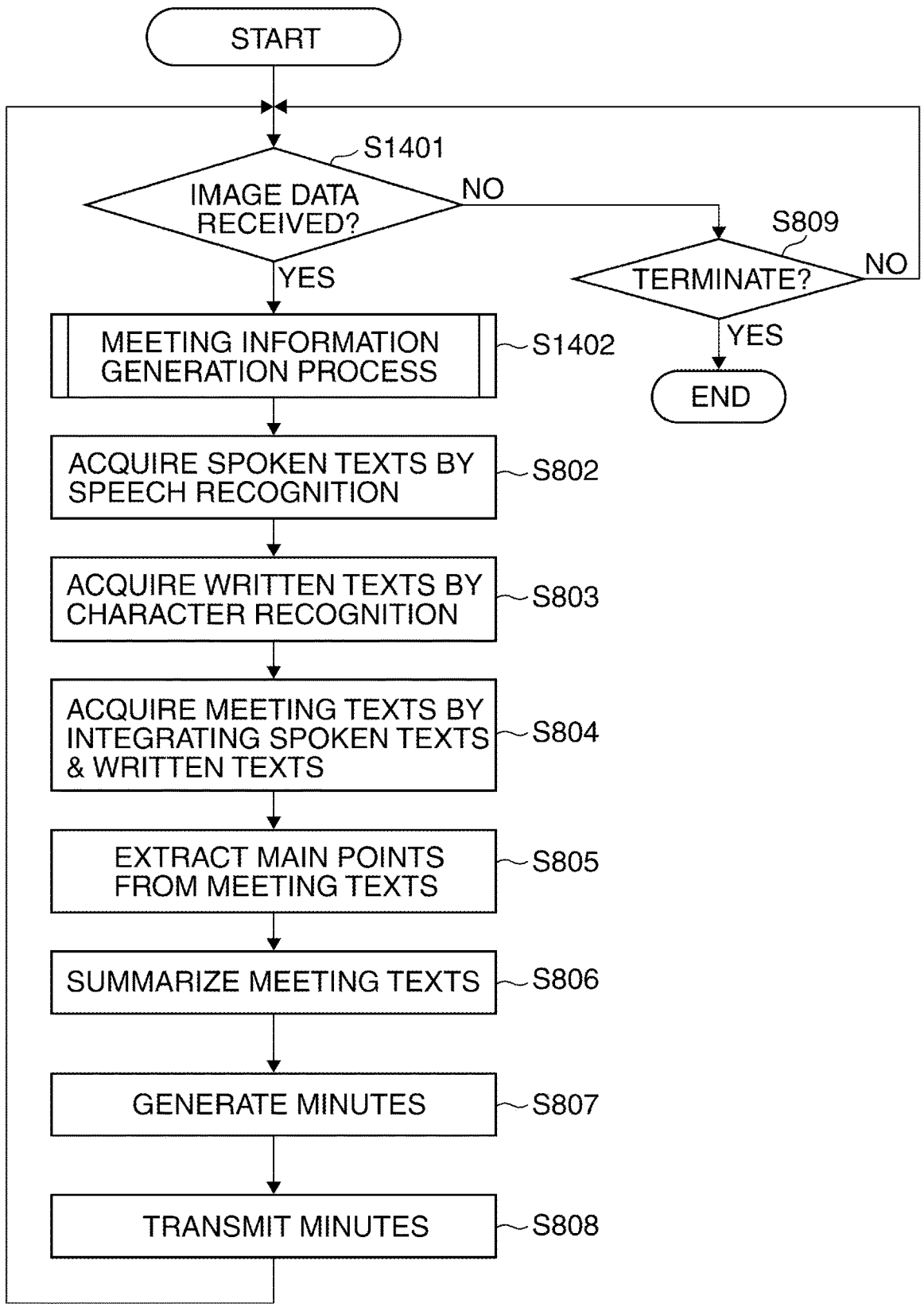
FIG. 14 is a flowchart of a meeting minutes generation process.

FIG. 14 is a flowchart of a meeting minutes generation process. This process is realized by the CPU 251 that reads out the meeting server program stored in the storage 255, loads the program into the RAM 254, and executes the same. The present process is started when the meeting server 102 is started.

In a step S1401, the CPU 251 determines whether or not moving image data has been received from the separate device via the external interface 258. If moving image data has not been received, in the step S809, the CPU 251 determines whether or not a termination instruction has been received. If the termination instruction has not been received, the CPU 251 returns to the step S1401, whereas if the termination instruction has been provided, the CPU 251 terminates the process in FIG. 14. On the other hand, if moving image data has been received, in a step S1402, the CPU 251 performs a meeting information generation process (see FIG. 15) for generating meeting information based on the received moving image data.

Figure 15:
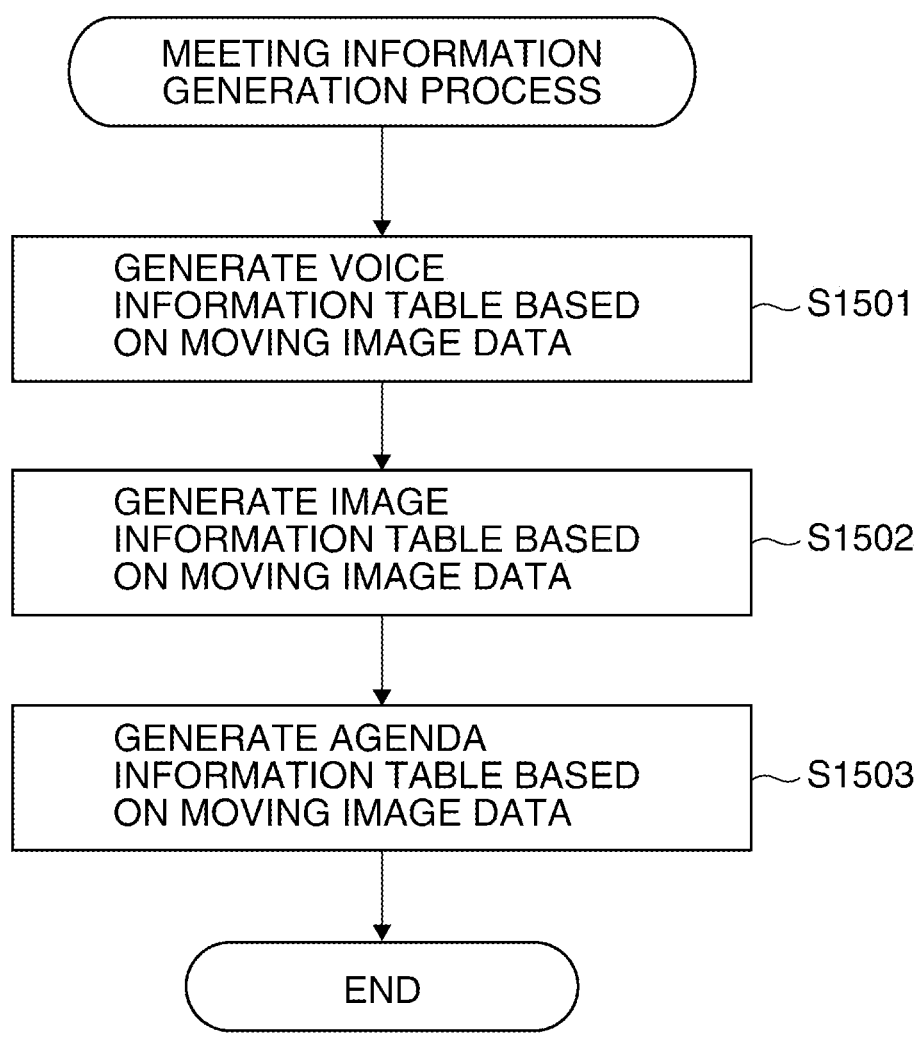
FIG. 15 is a flowchart of a meeting information generation process.

FIG. 15 is a flowchart of the meeting information generation process performed in the step S1402. In a step S1501, the CPU 251 generates the voice information table 400 (see FIG. 4A) based on the moving image data. First, the CPU 251 extracts voice data from the moving image data, and records the extracted voice data in the storage 255 as a file. Then, the CPU 251 records the file name (including a path) of the extracted voice data in a box of the voice data column 403 of the voice information table 400. Further, the CPU 251 calculates the voice recording start time and the voice recording end time based on the time stamp and the time length of the moving image data, and stores these times in associated boxes of the voice recording start time column 401 and the voice recording end time column 402 of the voice information table 400, respectively.

In a step S1502, the CP 251 generates the image information table 410 (see FIG. 4B) based on the moving image data. First, the CPU 251 scans the video data included in the moving image data from the start, and extracts frame images. The CPU 251 adds a record to the image information table 410 for each extracted frame image. The CPU 251 stores the extracted frame images in the storage 255 as a file of image data. Then, the CPU 251 records the file name (including a path) of the image data in a box of the image data column 412 of the added record. Further, the CPU 251 calculates, based on the time stamp of the moving image data and a position of the extracted frame image in the moving image data, a time at which this frame image was captured. The CPU 251 stores the calculated time in an associated box of the photographed time column 411 of the added record. Note that all of frame images included in the video data are not to be extracted, but frame images may be extracted at predetermined time intervals.

In a step S1503, the CPU 251 generates information of the agenda information table 420 (see FIG. 4C) based on the moving image data. First, the CPU 251 reads out chapter data included in the moving image data. The chapter data includes a chapter name, and a start time and an end time of the chapter. The CPU 251 adds a record to the agenda information table 420 for each chapter. Then, the CPU 251 records the chapter name in a box of the agenda item name column 423. The start time and the end time of the chapter data each indicate a position in the moving image data, in terms of time elapsed from the start of the moving image data, and hence the CPU 251 checks the time stamps in the moving image data, and calculates the start time and the end time as the real time of the chapter. Then, the CPU 251 stores the calculated start time and end time in associated boxes of the agenda item start time column 421 and the agenda item end time column 422 of the agenda information table 420, respectively. Then, the CPU 251 terminates the process in FIG. 15.

After execution of the step S1402 in FIG. 14, the CPU 251 executes the steps S802 to S808, similarly as described with reference to FIG. 8. More specifically, the CPU 251 generates the spoken information table 600 (FIG. 6A) and the written information table 610 (FIG. 6B) based on the meeting information generated in the process in FIG. 15, and generates the meeting text table 620 (FIG. 6C) by integrating these tables. Then, the CPU 251 generates the summary table 700 (FIG. 7) by summarizing the meeting text table 620, and generates the meeting minutes based on the summary table 700 and so forth. After execution of the step S808, the CPU 251 returns to the step S1401.

As described above, the meeting server 102 can generate minutes by acquiring spoken texts and written texts from moving image data acquired by capturing images of scenes of the meeting using a desired device having the image capturing function, and integrating and summarizing these texts.

According to the present embodiment, the summary table 700 is generated based on both of voice data and image data, acquired from moving image data, and the meeting minutes are generated based on the summary table 700 and so forth. Therefore, it is possible to obtain the same advantageous effects as provided by the first embodiment for generating meeting minutes by obtaining summaries from both of voice and images with reduced loss of information.

Note that in the present embodiment, the meeting apparatus 101 may receive moving image data from the separate device, and generate the meeting information based on the received moving image data. After that, similar to the first embodiment, the meeting apparatus 101 transmits the meeting information to the meeting server 102, and the meeting server 102 performs the meeting minutes generation process in FIG. 8 based on the received meeting information.

Although in the above-described embodiments, the meeting apparatus 101 and the meeting server 102 are separate apparatuses independent of each other, a single apparatus having the functions of both of the apparatuses may be configured as the summarization apparatus of the present invention. Alternatively, the meeting server 102 may be configured as an apparatus further equipped with one or both of a voice acquisition function for acquiring voice data and an image acquisition function for acquiring image data, and this apparatus may form the summarization apparatus of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-232087 filed Dec. 1, 2017, which is hereby incorporated by reference herein in its entirety.

What is claimed is:

1. An apparatus comprising:
one or more memories that store instructions; and
one or more processors configured to execute the instructions stored in the one or more memories to:
generate a first data table including first text information by converting voice data to texts and associating the converted voice data with a corresponding voice data time stamp;
generate a second data table including second text information by converting image data to texts and associating the converted image data with a corresponding image data time stamp;
generate a third data table including integrated text information by integrating the generated first text information included in the first data table and the generated second text information included in the second data table, wherein the generated integrated text information includes (i) the first text information and the corresponding voice data time stamp and (ii) the second text information and the corresponding image data time stamp; and
generate minutes by extracting text from the third data table including the generated integrated text information based on an appearance frequency of each word in the generated integrated text information including the first text information and the second text information.

2. The apparatus according to claim 1, wherein the minutes are generated by determining a text to be extracted out of the integrated text information and extracting the determined text from the integrated text information.

3. The apparatus according to claim 2, wherein all of texts generated based on the second text information are extracted out of the integrated text information.

4. The apparatus according to claim 2, wherein a text including a predetermined word is extracted from the integrated text information.

5. The apparatus according to claim 2, wherein the text to be extracted is determined by giving a weight to a text including a word included in the second text information out of the integrated text information.

6. The apparatus according to claim 1, wherein the integrated text information is summarized for each item to be discussed and the minutes are generated.

7. The apparatus according to claim 6, wherein a time period is associated with each item of agenda, wherein a generation time is associated with each text included in the integrated text information, and wherein the minutes are generated such that a text generated during the time period associated with each item of agenda is associated with the item of agenda.

8. The apparatus according to claim 1, wherein the first text information is generated by performing speech recognition on the voice data.

9. The apparatus according to claim 1, wherein the second text information is generated by performing image recognition on characters included in the image data.

10. The apparatus according to claim 1, wherein the one or more processors are configured to execute the instructions stored in the one or more memories to further generate third text information by converting electronically input data to texts, and wherein the integrated text information is generated by integrating the first text information, the second text information, and the third text information.

11. The apparatus according to claim 1, wherein the one or more processors are configured to execute the instructions stored in the one or more memories to further acquire the voice data from speech of a user.

12. The apparatus according to claim 1, wherein the one or more processors are configured to execute the instructions stored in the one or more memories to further acquire the image data by image capturing of characters entered by a user.

13. The apparatus according to claim 1, wherein the voice data and the image data are acquired from moving image data.

14. A system including an apparatus and a terminal that is capable of communicating with the apparatus,
the apparatus comprising:
one or more memories that store instructions; and
one or more processors configured to execute the instructions stored in the one or more memories to:
generate a first data table including first text information by converting voice data to texts and associating the converted voice data with a corresponding voice data time stamp;
generate a second data table including second text information by converting image data to texts and associating the converted image data with a corresponding image data time stamp;
generate a third data table including integrated text information by integrating the generated first text information included in the first data table and the generated second text information included in the second data table, wherein the generated integrated text information includes (i) the first text information and the corresponding voice data time stamp and (ii) the second text information and the corresponding image data time stamp; and
generate minutes by extracting text from the third data table including the generated integrated text information based on an appearance frequency of each word in the generated integrated text information including the first text information and the second text information, and
the terminal comprising:
one or more memories that store instructions; and
one or more processors configured to execute the instructions stored in the one or more memories to:
acquire voice data from speech of a user; acquire image data by image capturing of characters entered by a user; and
transmit the acquired voice data and the acquired image data tothe apparatus,
wherein the apparatus is configured to receive the acquired voice data and the acquired image data transmitted by the terminal.

15. The system according to claim 14, wherein the terminal receives an instruction for acquiring the image data from a user via a display screen during acquisition of the voice data.

16. The system according to claim 14, further comprising another terminal different from the terminal, wherein the another terminal electronically inputs data, and transmits the input data to the terminal, wherein the terminal receives the data transmitted from the another terminal, and wherein the terminal transmits the received data, the acquired voice data, and the acquired image data to the apparatus.

17. A method of controlling an apparatus, comprising:
generating a first data table including first text information by converting voice data to texts and associating the converted voice data with a corresponding voice data time stamp;

generating a second data table including second text information by converting image data to texts and associating the converted image data with a corresponding image data time stamp;

generating a third data table including integrated text information by integrating the generated first text information included in the first data table and the generated second text information included in the second data table, wherein the generated integrated text information includes (i) the first text information and the corresponding voice data time stamp and (ii) the second text information and the corresponding image data time stamp; and generating minutes by extracting text from the third data table including the generated integrated text information based on an appearance frequency of each word in the generated integrated text information including the first text information and the second text information.

18. The apparatus according to claim 1, wherein the one or more processors are configured to execute the instructions stored in the one or more memories to further generate the integrated text information by integrating the generated first text information and the generated second text information respectively for each acquisition time.

19. The apparatus according to claim 1, wherein the one or more processors are configured to execute the instructions stored in the one or more memories to further generate the texts by performing character recognition on a partial image which is a difference between an acquired image data and a previously-acquired image data.

* * * * *